United States Patent
Odaka et al.

(10) Patent No.: US 12,418,130 B2
(45) Date of Patent: Sep. 16, 2025

(54) CONNECTION BODY AND METHOD FOR MANUFACTURING CONNECTION BODY

(71) Applicant: DEXERIALS CORPORATION, Shimotsuke (JP)

(72) Inventors: Ryosuke Odaka, Tochigi (JP); Ryo Ito, Tochigi (JP); Hiroyuki Kumakura, Tochigi (JP); Tomoyuki Abe, Tochigi (JP); Daisuke Sato, Tochigi (JP); Katsuhisa Orihara, Tochigi (JP); Kazuhisa Aoki, Tochigi (JP)

(73) Assignee: DEXERIALS CORPORATION, Shimotsuke (JP)

( * ) Notice: Subject to any disclaimer, the term of this patent is extended or adjusted under 35 U.S.C. 154(b) by 399 days.

(21) Appl. No.: 17/910,987

(22) PCT Filed: Mar. 18, 2021

(86) PCT No.: PCT/JP2021/011169
§ 371 (c)(1),
(2) Date: Sep. 12, 2022

(87) PCT Pub. No.: WO2021/187591
PCT Pub. Date: Sep. 23, 2021

(65) Prior Publication Data
US 2023/0198186 A1    Jun. 22, 2023

(30) Foreign Application Priority Data

Mar. 19, 2020  (JP) .................................. 2020-050218
Mar. 18, 2021  (JP) .................................. 2021-044505

(51) Int. Cl.
*H01R 13/405*    (2006.01)
*H01R 4/04*      (2006.01)
(Continued)

(52) U.S. Cl.
CPC ............. *H01R 13/405* (2013.01); *H01R 4/04* (2013.01); *H01R 12/71* (2013.01); *H01R 43/02* (2013.01)

(58) Field of Classification Search
CPC ........ H01R 12/52; H01R 12/71; H01R 12/00; H01R 13/2414; H01R 13/2435; H01R 13/405; H05K 1/14
See application file for complete search history.

(56) References Cited

U.S. PATENT DOCUMENTS 5,819,406 A * 10/1998 Yoshizawa ............. H05K 3/325
                                                    29/877
6,110,399 A    8/2000 McArdle et al.
(Continued)

FOREIGN PATENT DOCUMENTS

CN    203055979 U    7/2013
JP    H06-15269 U    2/1994
(Continued)

OTHER PUBLICATIONS

Aug. 5, 2024 Office Action issued in Japanese Patent Application No. 2021-044505.
(Continued)

*Primary Examiner* — Tulsidas C Patel
*Assistant Examiner* — Carlos E Lopez-Pagan
(74) *Attorney, Agent, or Firm* — Oliff PLC

(57) ABSTRACT

A connection body capable of achieving fine pitch and miniaturization, and a method of manufacturing the connection body. A connection body includes: a substrate having a first terminal array; a connector having second terminal array; and an adhesive layer formed by curing a thermosetting connection material connecting the first terminal array and the second terminal array, wherein the second terminal array is disposed on the bottom surface of the connector and (Continued)

forms a level difference canceling portion for canceling a level difference in the bottom surface, and wherein the thermosetting connection material contains solder particles and a flux component. Thus, the first terminal array and the second terminal array can be connected, so that the terminal array can be made to have a fine pitch, and the connected body can be miniaturized.

12 Claims, 38 Drawing Sheets

(51) Int. Cl.
*H01R 12/71* (2011.01)
*H01R 43/02* (2006.01)

(56) References Cited

U.S. PATENT DOCUMENTS

| | | | | |
|---|---|---|---|---|
| 6,610,399 | B1* | 8/2003 | Crigler | D07B 1/162 |
| | | | | 428/920 |
| 2010/0110652 | A1* | 5/2010 | Takane | H05K 1/14 |
| | | | | 977/932 |
| 2013/0118672 | A1* | 5/2013 | Park | H05K 3/361 |
| | | | | 156/60 |
| 2017/0359904 | A1* | 12/2017 | Haga | H01L 24/83 |
| 2018/0301432 | A1* | 10/2018 | Shinohara | H01L 24/27 |

FOREIGN PATENT DOCUMENTS

| | | | |
|---|---|---|---|
| JP | H08-508610 A | | 9/1996 |
| JP | H10-284199 A | | 10/1998 |
| JP | 2008-305797 A | | 12/2008 |
| JP | 2011003924 A | * 1/2011 | ............ C09J 11/00 |
| JP | 2012-190558 A | | 10/2012 |
| JP | 2016-178068 A | | 10/2016 |
| WO | 2016/114160 A1 | | 7/2016 |

OTHER PUBLICATIONS

May 25, 2021 International Search Report issued in Patent Application No. PCT/JP2021/011169.
Jul. 16, 2024 Office Action issued in Taiwanese Patent Application No. 110110049.
Jan. 21, 2025 Office Action issued in Japanese Application No. 2021-044505.
May 7, 2025 Office Action issued in Japanese Application No. 2021-044505.
Jul. 29, 2025 Office Action issued in Japanese Application No. 2021-044505.
Aug. 2, 2025 Office Action issued in Chinese Application No. 202180019795.9.

* cited by examiner

CONNECTION BODY AND METHOD FOR MANUFACTURING CONNECTION BODY

TECHNICAL FIELD

The present technology relates to a connection body mounting a connector and a method for manufacturing the connection body. This application claims priority on the basis of Japanese Patent Application Serial No. 2020-050218, filed Mar. 19, 2020, and Japanese Patent Application Serial No. 2021-050218, filed Mar. 18, 2021, which are incorporated herein by reference.

BACKGROUND ART

Conventionally, a connector is mounted on a substrate by providing solder paste on the substrate or by providing solder on a conductor portion of the connector (BGA) and then solder mounting the connector by reflow (see, e.g., Patent Document 1). In recent years, in view of the demand for miniaturization of electronic equipment, there are needs for connectors having a pitch of 0.8 mm or less, or even 0.3 mm or less.

An example of the technique for connecting a terminal array having a narrow pitch is anisotropic connection; however, since the connector is usually a resin molded product, there is a concern in the anisotropic connection that the connector might be deformed by a pressure applied by a tool at the time of final pressure bonding, so that the cable cannot be inserted.

Further, in the conventional solder mounting of the connector that uses a solder resist for the terminal array on the substrate side, it is difficult to further reduce the pitch of the terminal array of the connector. Further, in the conventional connector, the lead terminals (gull-wing terminals) extending outward make the mounting area large and prevent the miniaturization of the mounting body.

CITATION LIST

Patent Literature

Patent Document 1: Japanese Unexamined Patent Application Publication No. 10-284199

SUMMARY OF INVENTION

Technical Problem

In view of such conventional circumstances, the present technology provides a connection body capable of achieving fine pitch and miniaturization, and a method of manufacturing the connection body.

Solution to Problem

A connection body according to the present technology includes: a substrate having a first terminal array; a connector having a second terminal array; and an adhesive layer formed by curing a thermosetting connection material connecting the first terminal array and the second terminal array, wherein the second terminal array is disposed on the bottom surface of the connector and forms a level difference canceling portion for canceling a level difference in the bottom surface, and wherein the thermosetting connection material contains solder particles and a flux component.

A method for manufacturing a connection body according to the present technology includes: placing, on a substrate having a first terminal array, via a thermosetting connection material containing solder particles and a flux component, a connector having a bottom surface on which a second terminal array is arranged and a level difference canceling portion for canceling a level difference in the bottom surface is formed; and thermally curing the thermosetting connection material at a temperature equal to or higher than the melting point of the solder particles without pressing the connector, thereby connecting the first terminal array and the second terminal array.

Advantageous Effects of Invention

The present technology arranges the terminal array on the bottom surface of the connector and cancels (absorbs) the level difference in the bottom surface, so that the terminal array can be made to have a fine pitch and the connector can be miniaturized.

DESCRIPTION OF EMBODIMENTS

Embodiments of the present technology will be described in detail in the following order with reference to the drawings.

1. CONNECTION BODY
2. THERMOSETTING CONNECTION MATERIAL
3. METHOD FOR MANUFACTURING CONNECTION BODY
4. CONNECTOR
5. EXAMPLES

1. CONNECTION BODY

The connection body according to the present embodiment includes: a substrate having a first terminal array; a connector having a second terminal array; and an adhesive layer formed by curing a thermosetting connection material connecting the first terminal array and the second terminal array, wherein the second terminal array is disposed on the bottom surface of the connector and forms a level difference canceling portion for canceling a level difference in the bottom surface, and wherein the thermosetting connection material contains solder particles and a flux component. This configuration can cancel the level difference in the bottom surface, so that the terminal array can be made to have a fine pitch, and the connector can be miniaturized.

By miniaturizing the connection body, it is possible to reduce weight and size of electronic devices. Further, it is possible to miniaturize a mounting substrate employed in an electronic device such as a smart phone or a personal computer. Further, the capacity of a battery can be increased. In addition, it is possible to expand functions by increasing the size of various electronic components such as a larger fingerprint sensor.

When the bottom surface of the connector has a level difference of a predetermined range of height, it is preferable that the difference between the maximum height and the minimum height of the terminal surface in the second terminal array is smaller than the height of the predetermined range. Thus, it is possible to cancel the level difference in the bottom surface of the connector and to connect the first terminal array and the second terminal array.

Preferably, the difference between the maximum height and minimum height of the terminal surfaces in the second terminal array is smaller than the average particle diameter of the solder particles. Thus, the terminal array can be made to have a finer pitch, and the connection body can be further miniaturized.

Here, the connector is mainly a resin molded article having a fitting portion. The connector may be, e.g., a plug and receptacle of a substrate-to-substrate connector, a substrate-to-flexible printed circuit board (FPC) connector, or a surface mount device (SMD) such as an FPC connector for fitting an FPC by a flip-lock. The connection body refers to an article that is formed by electrically connecting two materials or members.

Figure 1:
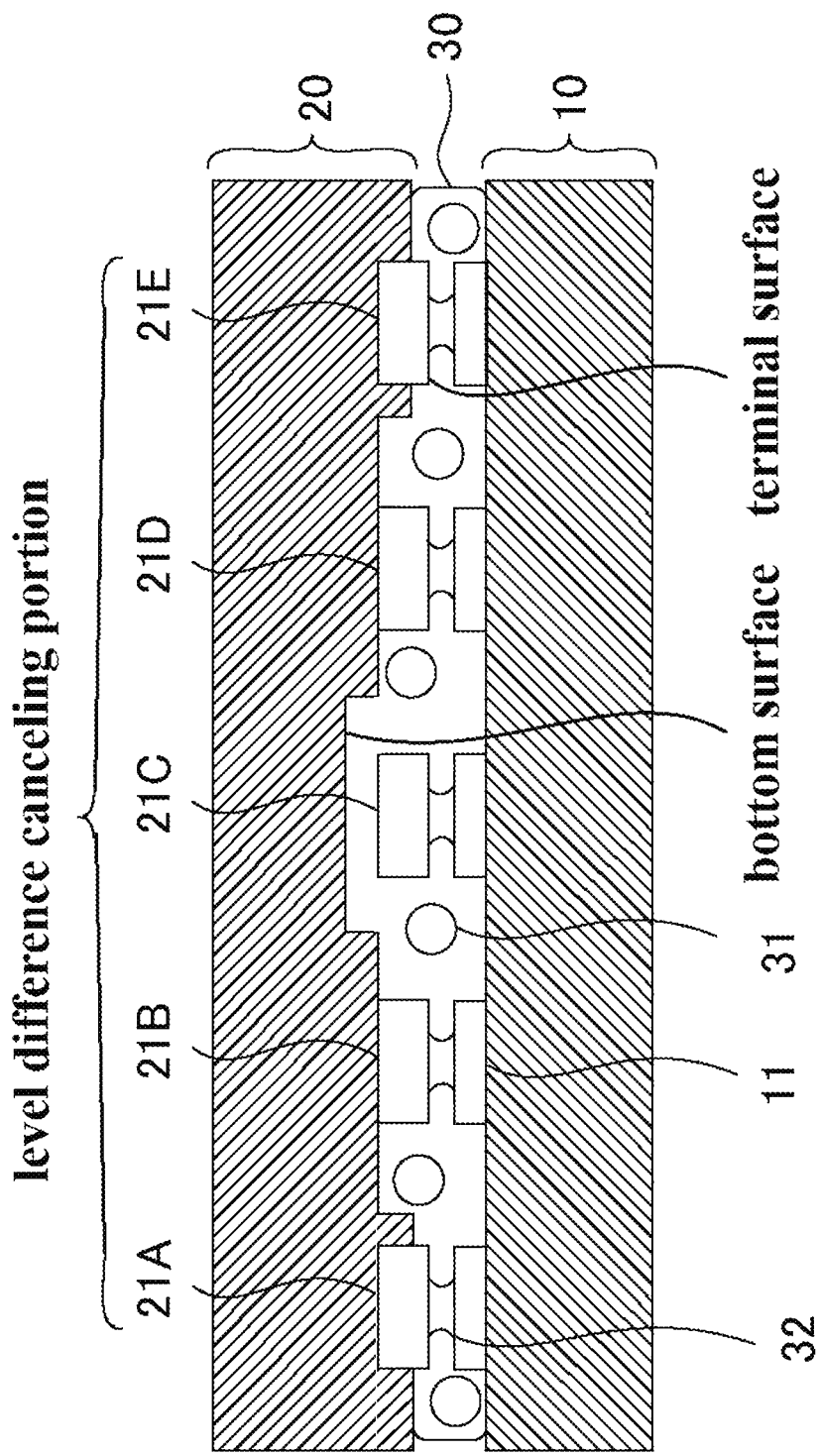
FIG. 1 is a cross-sectional view schematically illustrating an example of a connection body according to this embodiment.

FIG. 1 is a cross-sectional view schematically illustrating an example of a connection body according to this embodiment. As shown in FIG. 1, the connector includes: a substrate 10 having a first terminal array 11, a connector 20 having second terminal array 21 (terminals 21A to 21E), and an adhesive layer 30 formed by curing a thermosetting connection material connecting the first terminal array 11 and the second terminal array 21 (terminals 21A to 21E).

The substrate 10 has a first terminal array 11 corresponding to the second terminal array 21 (terminals 21A to 21E) of the connector 20. The substrate 10 is not particularly limited, and may be defined in a broad sense as a so-called printed circuit board (PWB), and may be a rigid substrate or a flexible substrate. Examples of substrates according to the type of the base material may include, e.g., glass substrates, ceramic substrates, and plastic substrates, among others.

Further, it is preferable that processed portion (e.g., walls and grooves) for preventing short circuit by solder resist is not formed between adjacent terminals (gap portions) of the first terminal array 11. The height of the terminal surface of the first terminal array 11 may be the same as that of the substrate surface (flat connection surface without terminal protrusion) or the terminal may protrude from the substrate surface as shown in FIG. 1. Thus, the first terminal array 11 and the second terminal array 21 (terminals 21A to 21E) can be connected by solder particles, and the terminal arrays can be made to have a fine pitch.

The connector 20 has a level difference canceling portion composed of the second terminal array 21 (terminals 21A to 21E) on a surface contacting the thermosetting connection material. Since the connector 20 is a resin molded product, the bottom surface of the connector 20 usually has a level difference (undulation) in the range of about 20 μm formed by the resin mold at the time of manufacture.

The level difference canceling portion cancels the level difference in the bottom surface of the connector 20 by aligning the height of the terminal surfaces of the second terminal array 21 (terminals 21A to 21E). The difference between the maximum height and minimum height of the terminal surfaces of the second terminal array 21 (terminals 21A to 21E) is preferably smaller than the level difference in the bottom surface of the connector 20 and than the average particle diameter of the solder particles, preferably 10 μm or less, and more preferably 5 μm or less.

Here, the average particle diameter is the average value of the major axis diameter of the particles measured, e.g., at N=20 or more, preferably at N=50 or more, more preferably at N=200 or more, in an observation image by using a metal microscope, an optical microscope, and an electron microscope such as an SEM (Scanning Electron Microscope), and is the average value of the diameter of the particles when the particles are spherical. In addition, the value may be a measured value measured by using a known image analysis software ("WinROOF" available from MITANI CORPORATION, "A-zo-kun (registered trademark)" available from Asahi Kasei Engineering Corporation) or a measured value (N=1,000 or more) measured by using an image type particle diameter distribution measuring device (e.g., FPIA-3000 (Malvern)). The average particle diameter obtained from the observation image or measured by the image type particle diameter distribution measuring device can be used as the average value of the maximum length of particles. In manufacturing of the thermosetting connection material, it is possible to simply use manufacturer values such as a particle diameter (D50) at which the accumulated value in the particle diameter distribution obtained by the laser diffraction/scattering method reaches 50%, or an arithmetic average diameter (preferably on a volume basis), among other values.

As shown in FIG. 1, the level difference canceling portion may have a terminal fitted in the resin mold such as the second terminals 21A and 21E, a terminal formed on the resin mold surface such as the second terminals 21B and 21D, and a terminal formed apart from the resin mold surface such as the second terminal 21C. The level difference canceling portion can be formed, e.g., by bending lead terminals extending toward the outside of the connector to the bottom surface of the connector and aligning the height of the terminal surface. The level difference canceling portion can be formed, e.g., by forming a terminal so as to be positioned on the bottom surface in advance and then molding the resin. Alternatively, the terminal surfaces may be polished as necessary to align the height of the terminal surfaces.

As will be described later, the adhesive layer 30 is formed by curing a thermosetting connection material containing solder particles 31 and a flux component to form a film. In the adhesive layer 30, the first terminal array 11 of the substrate 10 and the second terminal array 21 of the connector 20 are solder-joined at solder-joint portions 32, and the substrate 10 and the connector are bonded by a thermosetting binder of a thermosetting connection material. One terminal surface may include a plurality of the solder-joint portions 32 and the portions bonded by the thermosetting binder.

In the connection body according to the present embodiment, the upper limit of the minimum inter-terminal distance between adjacent terminals (space distance) in the first terminal array 11 and the second terminal array 21 is 800 μm or less, preferably 300 μm or less, and more preferably 150 μm or less. The lower limit of the minimum inter-terminal distance in the first terminal array 11 and the second terminal array 21 is 30 μm or more, more preferably 50 μm or more, and still more preferably 70 μm or more.

The upper limit of the ratio of the average particle diameter of the solder particles 31 to the minimum inter-terminal distance in the first terminal array 11 and the second terminal array 21 is less than 0.15, and more preferably less than 0.1. The minimum value of the sum of the terminal height (distance) from the terminal surface of the first terminal array 11 to the substrate surface and the terminal height (distance) from the terminal surface of the second terminal array 21 to the bottom surface of the connector is preferably larger than the average particle diameter of the solder particles 31.

The surfaces of the terminals of the first terminal array 11 and the second terminal array 21 may be gold-plated. The substrate 10 and the connector 20 preferably have heat resistance in reflow process.

The connection body according to the present embodiment can cancel (absorb) the level difference in the bottom surface by the level difference canceling (absorbing) portion composed of the second terminal array 21 (terminals 21A to 21E) formed on the bottom surface of the connector 20 and allow the connection via solder particles, so that the terminal array can be made to have a fine pitch, and the connector can be miniaturized.

The connection body according to this embodiment is connected by solder particles widely used in, e.g., solder paste, and BGA (ball grid array), and because of the high connection reliability, the connection body can be applied to many applications such as sensor equipment, discrete components, various IC chips, modules, eSim (embedded subscriber identity module), SoC (system on a chip), in-vehicle devices, and IoT (Internet of Things) devices.

Figure 2:
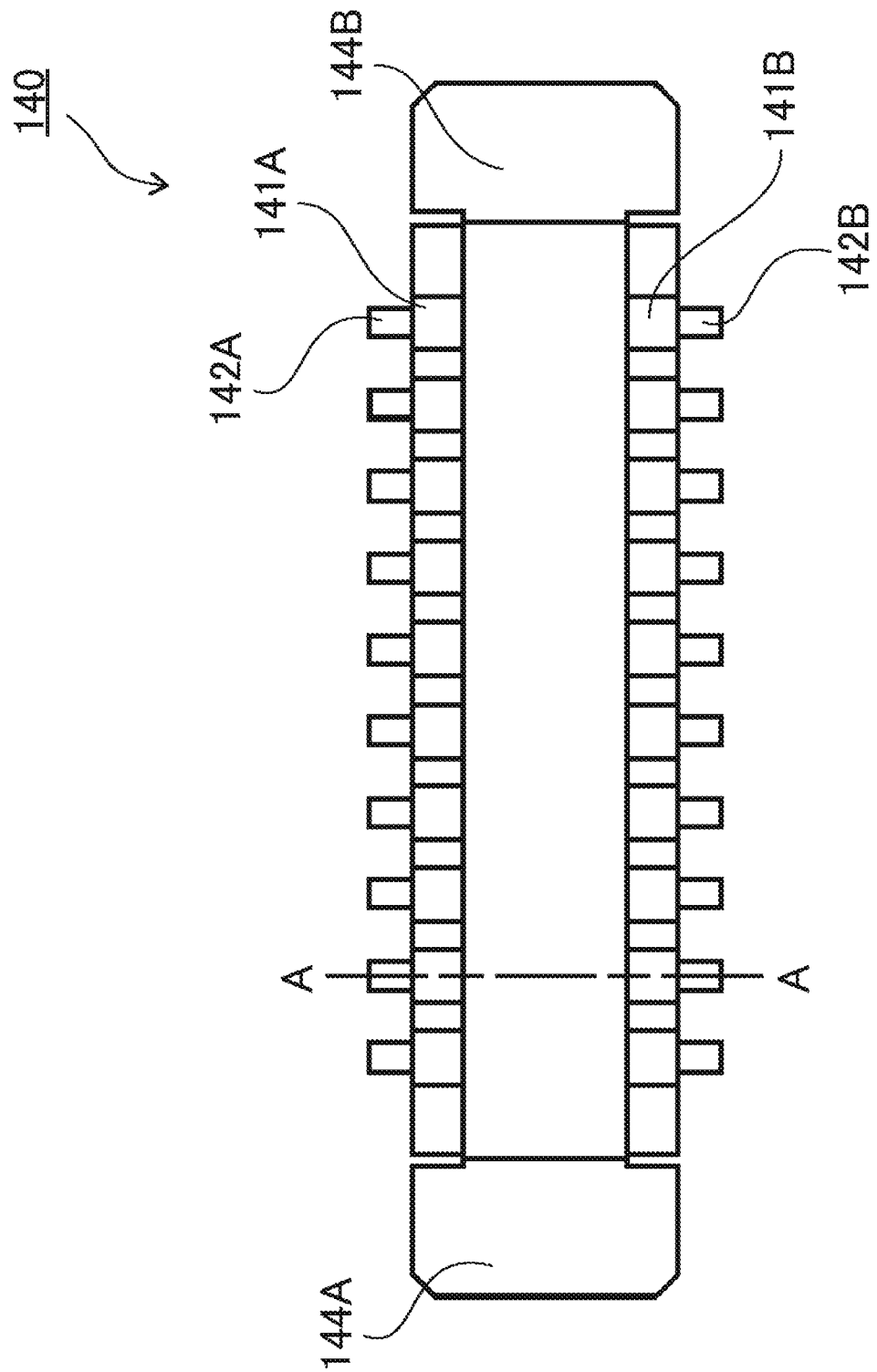
FIG. 2 is a top view illustrating an example of a plug according to the prior art.
Figure 3:
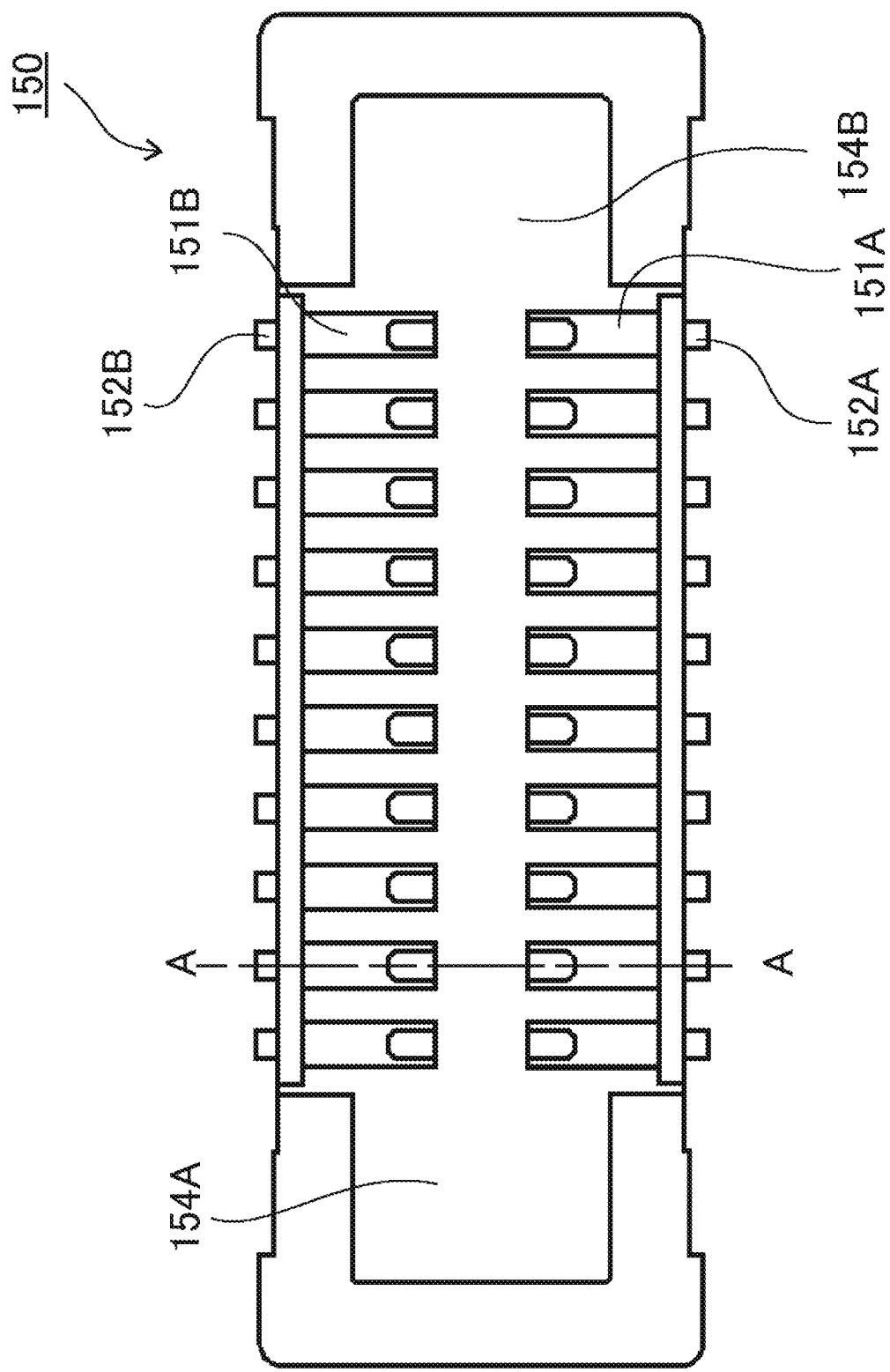
FIG. 3 is a top view illustrating an example of a receptacle according to the prior art.
Figure 4:
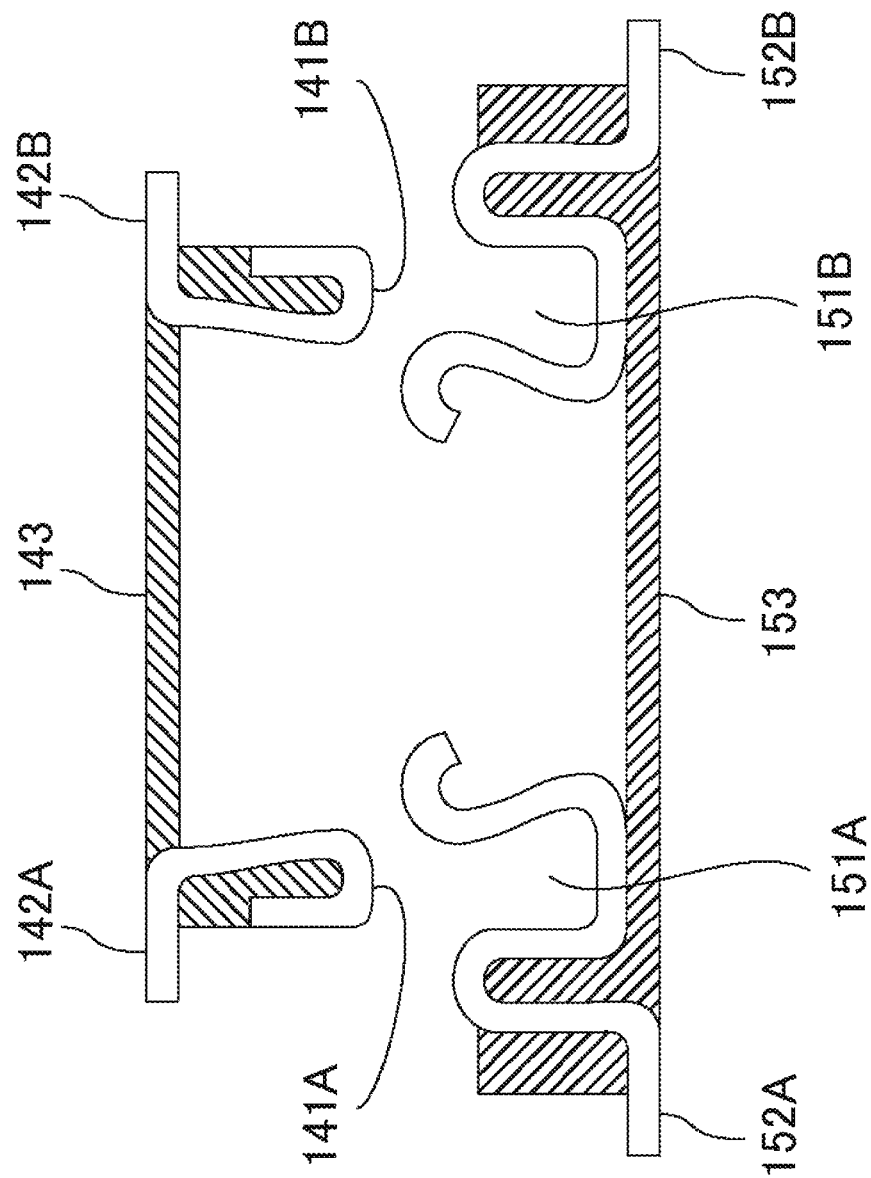
FIG. 4 is a cross-sectional view of the plug shown in FIG. 2 and the receptacle shown in FIG. 3 taken along line A-A.

FIGS. 2 to 4 are views showing an example of a plug and receptacle of a substrate-to-substrate connector according to the prior art, in which FIG. 2 is a top view illustrating an example of a plug according to the prior art, FIG. 3 is a top view illustrating an example of a receptacle according to the prior art, and FIG. 4 is a cross-sectional view of the plug shown in FIG. 2 and the receptacle shown in FIG. 3 taken along line A-A.

A plug 140 according to the prior art includes: a first male vertical fitting array 141A; a second male vertical fitting array 141B; a first lead terminal array 142A extending from the first male vertical fitting array 141A to the bottom surface and extending outward in the transverse direction; a second lead terminal array 142B extending from the second male vertical fitting array 142A to the bottom surface and extending outward in the transverse direction; and an insulating resin 143 for fixing them. The plug 140 according to the prior art also includes a first reinforcing portion 144A provided at one end in the longitudinal direction and a second reinforcing portion 144B provided at the other end in the longitudinal direction. In some cases, reinforcing metal fittings may be formed on the bottom surfaces of the first reinforcing portion 144A and the second reinforcing portion 144B since soldering of the first lead terminal array 142A and the second lead terminal array 142B will be insufficient for achieving a desired bonding strength.

The receptacle 150 according to the prior art includes: a first female vertical fitting array 151A; a second female vertical fitting array 151B; a first lead terminal array 152A extending from the first female vertical fitting array 151A to the bottom surface and extending outward in the transverse direction; a second lead terminal array 152B extending from the second female vertical fitting array 152A to the bottom surface and extending outward in the transverse direction; and an insulating resin 153 for fixing them. The receptacle 150 according to the prior art also includes a first reinforcing portion 154A provided at one end in the longitudinal direction and a second reinforcing portion 154B provided at the other end in the longitudinal direction. In some cases, reinforcing metal fittings may be formed on the bottom surfaces of the first reinforcing portion 154A and the second reinforcing portion 154B as in the case of the plug 140 since soldering of the first lead terminal array 152A and the second lead terminal array 152B will be insufficient for achieving a desired bonding strength.

The connector composed of the plug 140 and the receptacle 150 according to the prior art is a so-called centipede type connector in which a lead terminal array extends outward and requires a relatively large mounting area, the reinforcing portions to compensate insufficient adhesion further preventing miniaturization. Further, when there is a level difference of a predetermined range in height on the bottom surface of the connector, the average particle diameter of the solder particles must be larger than the level difference in the predetermined range in order to connect them by solder particles, which prevents the terminal array from having a fine pitch.

Figure 5:
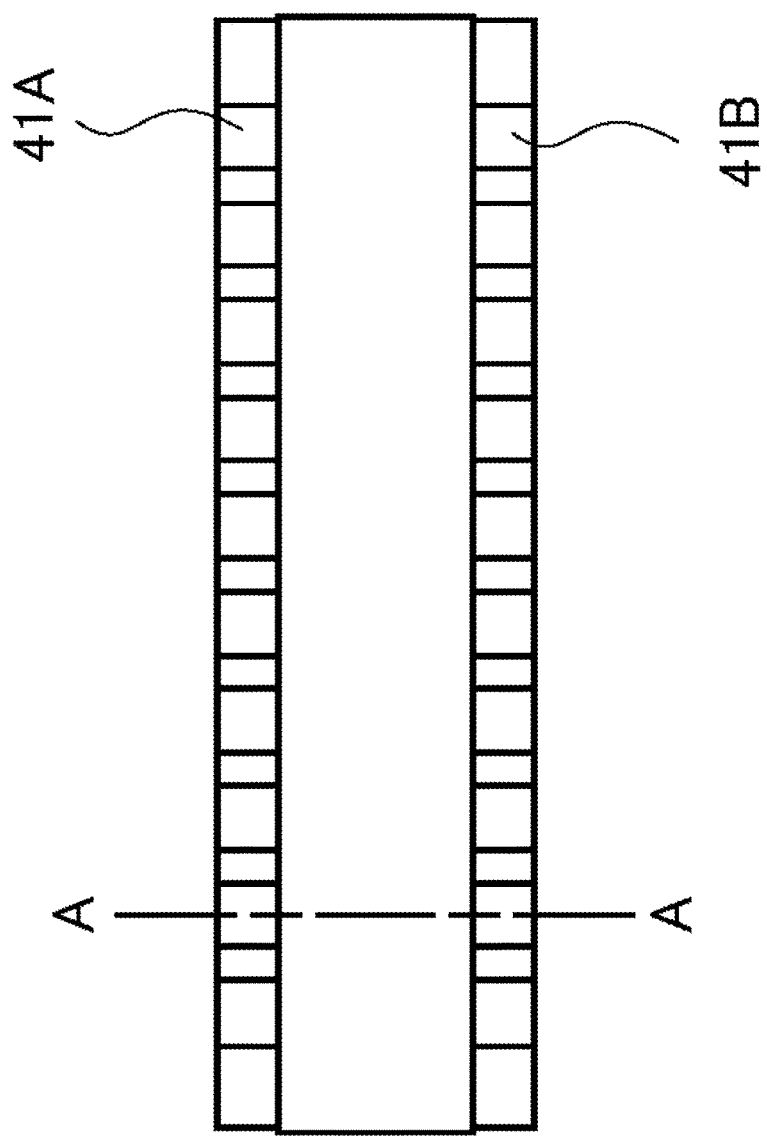
FIG. 5 is a top view illustrating an example of a plug according to the present embodiment.
Figure 6:
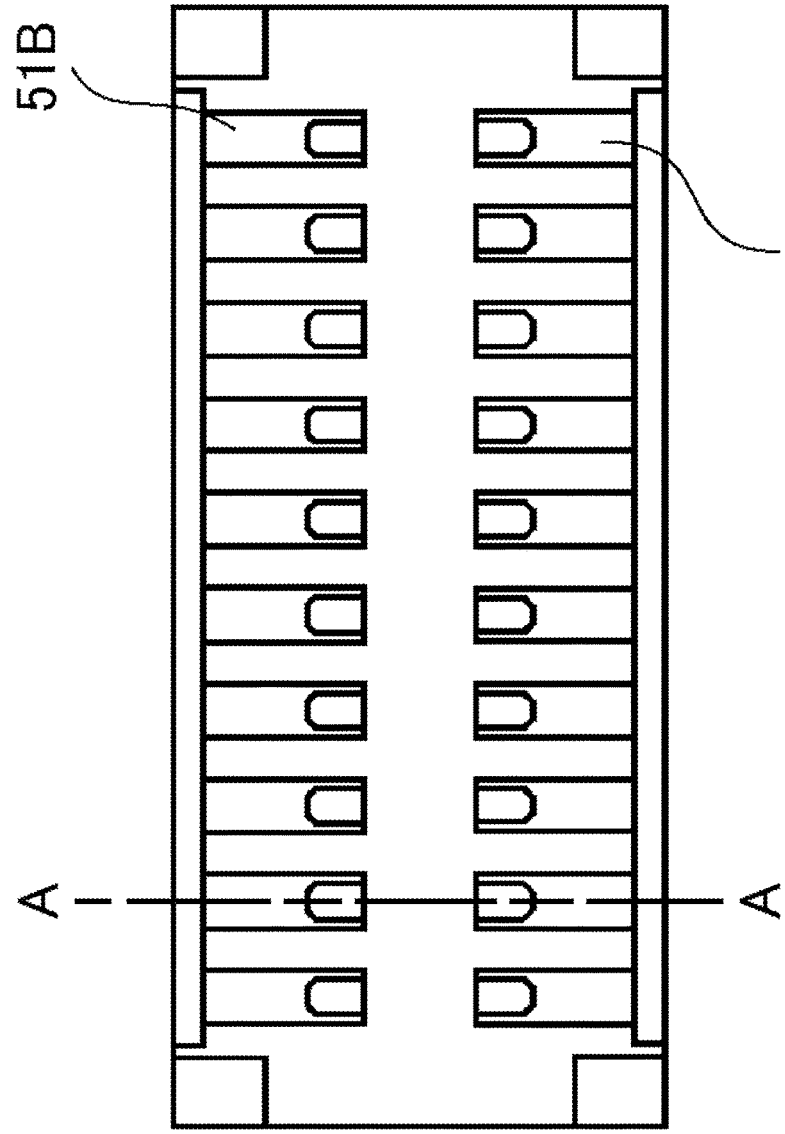
FIG. 6 is a top view illustrating an example of a receptacle according to the present embodiment.
Figure 7:
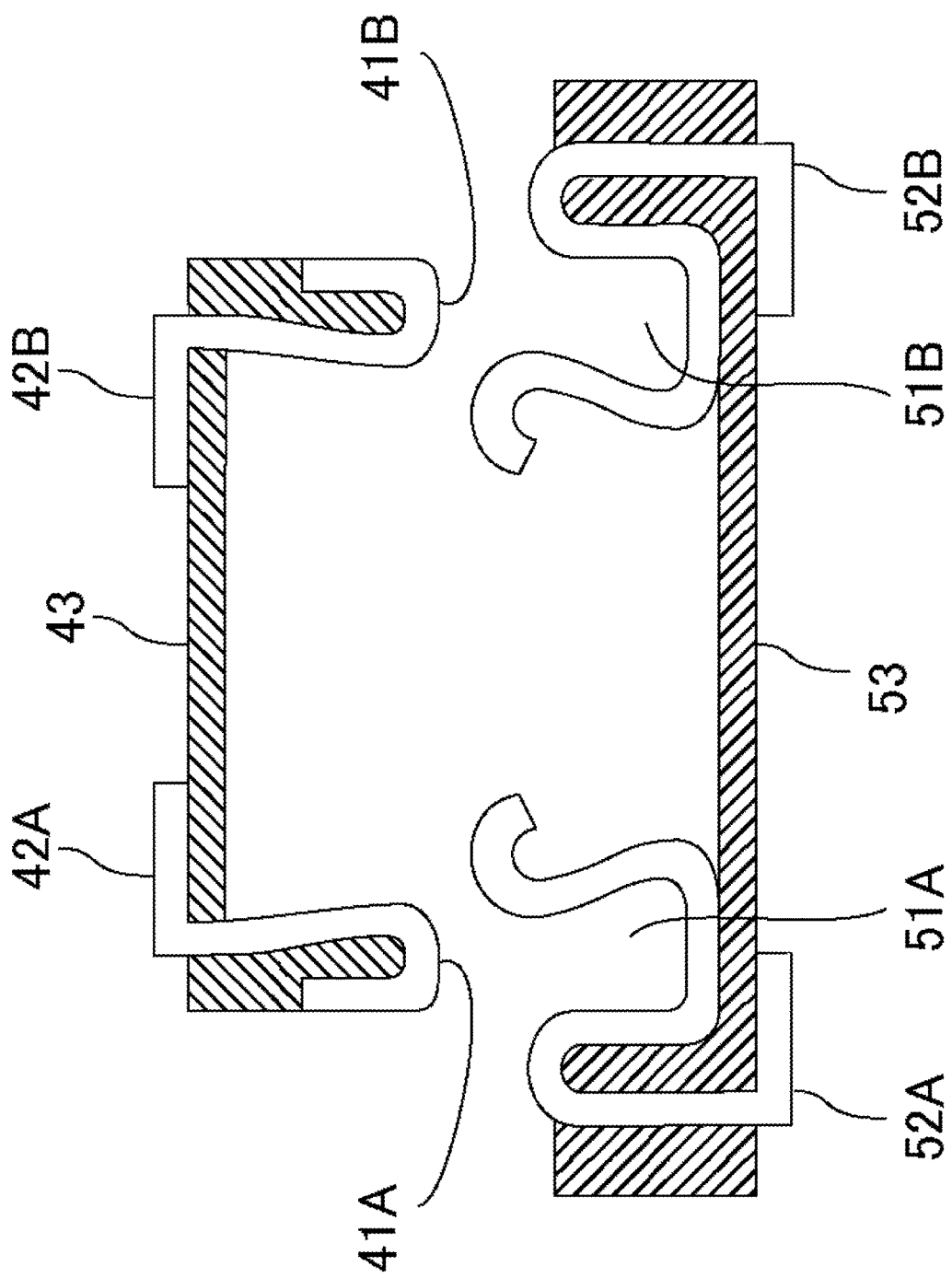
FIG. 7 is a cross-sectional view of the plug shown in FIG. 5 and the receptacle shown in FIG. 6 taken along line A-A.

FIGS. 5 to 7 are views showing an example of a plug and receptacle of a substrate-to-substrate connector according to this embodiment, in which FIG. 5 is a top view illustrating an example of a plug according to this embodiment, FIG. 6 is a top view illustrating an example of a receptacle according to this embodiment, and FIG. 7 is a cross-sectional view of the plug shown in FIG. 5 and the receptacle shown in FIG. 6 taken along line A-A.

The plug 40 according to the present embodiment includes: a first male vertical fitting array 41A; a second male vertical fitting array 41B; a first terminal array 42A extending from the first male vertical fitting array 41A to the bottom surface and extending inward in the transverse direction; a second terminal array 42B extending from the second male vertical fitting array 41B to the bottom surface and extending inward in the transverse direction; and an insulating resin 43 for fixing them, wherein the first terminal array 42A and the second terminal array 42B protrude from the bottom surface and form a level difference canceling portion having terminal surfaces the heights of which are aligned.

The receptacle 50 according to the present embodiment includes: a first female vertical fitting array 51A; a second female vertical fitting array 51B; a first terminal array 52A extending from the first female vertical fitting array 51A to the bottom surface and extending inward in the transverse direction; a second terminal array 52B extending from the second female vertical fitting array 51B to the bottom surface and extending inward in the transverse direction; and an insulating resin 53 for fixing them, wherein the first terminal array 52A and the second terminal array 52B protrude from the bottom surface and form a level difference canceling portion the variation in heights of which is reduced.

The first male vertical fitting array 41A of the plug 40 and the first female vertical fitting array 51A of the receptacle 50 are formed of a metal that is shaped so as to be vertically fitted, and the second male vertical fitting array 41B of the plug 40 and the second female vertical fitting array 51B of the receptacle 50 are formed of a metal that is shaped so as to be vertically fitted.

The insulating resins 43 and 53 are made of, e.g., polyamide or LCP and fix the first terminal array 42A and the second terminal array 42B of the plug 40 as well as the first terminal array 52A and the second terminal array 52B of the receptacle 50 by, e.g., resin molding.

In other words, the difference between the present embodiment and the prior art is that the terminal arrays of the plug and receptacle according to the present embodiment extend from the outside to the inside of the bottom surface of the connector, while the terminal arrays of the plug and receptacle according to the prior art extend from the bottom surface of the connector to the outside. Further, the present embodiment and the prior art is also different in that the plug and the receptacle according to the present embodiment need not have a reinforcing portion, whereas the plug and the receptacle according to the prior art need to have a reinforcing portion.

According to the plug and receptacle according to the present embodiment, the mounting area can be reduced as compared with a conventional centipede type connector by arranging the terminal array on the bottom surface. Further, the present embodiment can cancel level difference in the bottom surface of the connector, so that the terminal array can be made to have a fine pitch, and the connector can be miniaturized. Further, since the bottom surface of the connector is bonded with a thermosetting connection material, it is possible to omit the reinforcing portions in which reinforcing metal fittings are formed, so that the connector can be further miniaturized.

2. THERMOSETTING CONNECTION MATERIAL

The thermosetting connection material according to the present embodiment contains solder particles and a flux component. The flux component removes the oxide film on the surface of the solder particles and the terminal, and reduces the surface tension of the melted solder, so that the terminals can be connected by an unloaded reflow without thermocompression bonding with a tool. The term "unloaded" refers to a state in which there is no mechanical pressurization during reflow.

The thermosetting connection material may be either a film-like thermosetting connection film or a paste-like thermosetting connection paste. The thermosetting connection paste may be formed into a film at the time of connection, or may be formed into a form close to a film by mounting components.

In the case of the thermosetting connection paste, an application method such as dispensing, stamping, and screen printing may be used as long as the employed method can uniformly apply a predetermined amount of the paste on the substrate, and the paste may be dried as necessary. In this case, it can be expected to reduce capital investment by diverting, modifying, and applying conventional solder paste facilities.

Thermosetting connection films are particularly preferable because the amount of bonding material (e.g., an anisotropic conductive bonding material) can be made uniform based on the film thickness, and the film can be collectively laminated on the substrate to reduce the tact time. In addition, a film formed in advance is expected to improve the work efficiency since the film is easy to handle.

The thermosetting connection film can collectively laminate components on the substrate, the component including not only connectors but also various electronic components such as discrete components, various IC chips, modules, eSim, and SoC, so that it is possible to reduce the tact time and achieving a fine pitch of various electronic components. Further, achieving fine pitch of various electronic components makes it possible to reduce the distance between adjacent mounting components, thereby enabling high-density mounting. Moreover, achieving fine pitch of the various electronic components reduces the size of the components, which increases the number of pieces cut out from a single wafer, thereby reducing the cost. In addition, not only the wafer but also various electronic components can be reduced in cost by reducing the size of the components.

Further, the connection using the thermosetting connection material is not limited to the above-mentioned components, and can be applied to all shapes in which an SMT (surface mount technology) component has connection terminals for electrical conduction and the height of the connection terminals is flat or protruding with respect to the bottom surface. In addition, various electronic components fixed with a thermosetting connection material and various electronic components fixed with a connection material such as solder paste can be simultaneously put into reflow to connect them.

The minimum melt viscosity of the thermosetting connection material may be less than 100 Pa*s, preferably 50 Pa*s or less, more preferably 30 Pa*s or less, and still more preferably 10 Pa*s or less. Excessive minimum melt viscosity will not progress the resin melting in the unloaded reflow and might cause a problem in holding the solder particles between the terminals. The minimum melt viscosity reaching temperature of the thermosetting connection material is preferably $-10°$ C. to $-60°$ C. of the melting point of the solder particles, more preferably $-10°$ C. to $-50°$ C. of the melting point of the solder particles, and still more preferably $-10°$ C. to $-40°$ C. of the melting point of the solder particles. Thus, the resin can be melted by reaching the minimum melt viscosity before the solder is melted, the solder particles can be melted after the resin is melted, and then the resin can be cured, so that a good solder joint can be achieved. Here, the minimum melt viscosity reaching temperature of the thermosetting connection material refers to, e.g., the temperature at which the viscosity reaches the minimum value (minimum melt viscosity) when measured by using, e.g., a rotary rheometer (manufactured by TA Instrument) under the conditions of a measuring pressure of 5 g, a temperature range of 30 to 200° C., a temperature rising speed of 10° C./min, a measuring frequency of 10 Hz, a measuring plate diameter of 8 mm, and a load variation of 5 g on the measuring plate.

The thermosetting connection material preferably has an exothermic peak temperature higher than the melting point of the solder particles and preferably has a melting temperature lower than the melting point of the solder particles. Thus, after the thermosetting binder is melted, the solder is melted while the solder particles are held between the terminals, so that a terminal array having a fine pitch can be joined. Here, the exothermic peak temperature can be measured by differential scanning calorimetry (DSC) under the conditions in which a sample of 5 mg or more is measured in an aluminum pan, the temperature range is 30 to 250° C., and the temperature rising rate is 10° C./min.

When the thermosetting connection material is in the form of a film, the lower limit of the ratio of the average particle diameter of the solder particles to the thickness of the thermosetting connection material is preferably 0.5 or more, and more preferably 0.6 or more. This range facilitates the holding of the solder particles between the terminals and works with a fine pitch terminal array. The film thickness can be measured by using a known micrometer or digital thickness gauge capable of measuring 1 μm or less, preferably 0.1 μm or less (e.g., MDE-25M available from MITSUTOYO, minimum display size 0.0001 mm). The film thickness may be determined by measuring 10 or more locations and averaging them. However, when the film thickness is smaller than the particle diameter, a contact type thickness measuring instrument is not suitable, and a laser displacement meter (e.g., Spectroscopic Interference Displacement Type SI-T Series available from Keyence) is preferably used. Here, the film thickness is the thickness of only the resin layer and does not include the particle diameter. In addition, the average particle diameter can be confirmed by arbitrarily extracting five or more areas of 1 mm² or more in the plane view of the film using a known metal microscope or optical microscope.

Solder Particles

The solder particles may or may not be those specified in JIS Z 3282-1999, e.g., Sn—Pb, Pb—Sn—Sb, Sn—Sb, Sn—Pb—Bi, Bi—Sn, Sn—Bi—Cu, Sn—Cu, Sn—Pb—Cu, Sn—In, Sn—Ag, Sn—Pb—Ag, Pb—Ag, or the like, and may be appropriately selected according to the terminal material and connection conditions.

The lower limit of the melting point of the solder particles is preferably 110° C. or more, more preferably 120° C. or more, still more preferably 130° C. or more. The upper limit of the melting point of the solder particles may be 200° C. or less, preferably 180° C. or less, more preferably 160° C. or less, still more preferably 150° C. or less. The solder particles may have a flux compound directly bonded to the surface for the purpose of activating the surface. Activating the surface can promote metal bonding with the electrode portion.

The average particle diameter of the solder particles is preferably 0.2 times or less of the minimum value of the inter-terminal distance (space distance) in the first terminal array of the substrate and the second terminal array of the connector. If the average particle diameter of the solder particles is larger than 0.2 times the minimum inter-terminal distance in the first terminal array of the substrate and the second terminal array of the connector, a short circuit is likely to occur.

The lower limit of the average particle diameter of the solder particles is preferably 0.5 μm or more, more preferably 3 μm or more, and still more preferably 5 μm or more. The average particle diameter of the solder particles smaller than 0.5 μm may not achieve a good solder jointing state with the terminal and tends to deteriorate reliability. The upper limit of the average particle diameter of the solder particles may be 50 μm or less, preferably 30 μm or less, more preferably 20 μm or less, still more preferably 10 μm or less.

The maximum diameter of the solder particles may be 200% or less of the average particle diameter, preferably 150% or less of the average particle diameter, and more preferably 120% or less of the average particle diameter. By setting the maximum diameter of the solder particles within the above range, the solder particles can be held between the terminals, and the terminal arrays can be joined by melting the solder particles.

The solder particles may be agglomerates in which a plurality of solder particles are agglomerated. In the case where the solder particles forms an agglomerate in which a plurality of solder particles are agglomerated, the size of the agglomerate may be equal to the average particle diameter of the solder particles described above. The size of the agglomerate can be determined by observation with an electron microscope or an optical microscope.

The lower limit of the mass ratio range of the compounded amount of the solder particles is preferably 10 wt % or more, more preferably 20 wt % or more, and still more preferably 30 wt % or more, and the upper limit of the mass ratio range of the compounded amount of the solder particles is preferably 70 wt % or less, more preferably 60 wt % or less, and still more preferably 50 wt % or less.

Insufficient compounding amount of the solder particles cannot achieve excellent conductivity, and excessive compounding amount will impair insulation between the terminals to degrade conductivity reliability. When the solder particles are present in the thermosetting binder, blending may be based on the volume ratio, and when the thermosetting connection material is to be manufactured (before the solder particles are present in the binder), blending may be based on the mass ratio. The mass ratio can be converted into the volume ratio according to the specific gravity of the blended material and the blending ratio, among others.

The solder particles are preferably dispersed in a thermosetting binder, and the solder particles may be randomly arranged or may be regularly arranged in a certain regular pattern. Examples of the regular arrangement include a lattice arrangement such as a square lattice, a hexagonal lattice, an oblique lattice, and an elongated lattice. The solder particles may be disposed as agglomerates in which a plurality of solder particles are agglomerated. In this case, the arrangement of the agglomerates in the plan view of the thermosetting connection material may be regular or random, as with the arrangement of the solder particles described above.

Flux Component

Preferable examples of the flux component may include a carboxylic acid such as levulinic acid, maleic acid, oxalic acid, malonic acid, succinic acid, glutaric acid, adipic acid, and sebacic acid. These can achieve good solder connection, and when the epoxy resin is blended, these can function as a curing agent for the epoxy resin.

A blocked carboxylic acid the carboxyl group of which is blocked with an alkyl vinyl ether may be used as the flux compound. This can control the flux effect and the temperature at which the curing function is exerted. Further, this improves the solubility to the resin, thereby improving the unevenness of mixing and applying during film forming.

Thermosetting Binder

Examples of the thermosetting binder (insulating binder) may include a thermal radical polymerization type resin composition containing a (meth) acrylate compound and a thermal radical polymerization initiator, a thermal cation polymerization type resin composition containing an epoxy compound and a thermal cation polymerization initiator, and a thermal anion polymerization type resin composition containing an epoxy compound and a thermal anion polymerization initiator. Known pressure-sensitive adhesive compositions may also be used. The (meth) acrylic monomer includes both an acrylic monomer and a methacrylic monomer.

Hereinafter, a thermal anion polymerization type resin composition containing a solid epoxy resin, a liquid epoxy resin, and an epoxy resin curing agent will be described as a specific example.

The solid epoxy resin is not particularly limited as long as it is solid at normal temperature and has one or more epoxy groups in the molecule, and may be, e.g., a bisphenol A epoxy resin or a biphenyl epoxy resin. Thus, the film shape can be maintained. The normal temperature is in the range of 20° C.±15° C. (5° C. to 35° C.) as defined in JIS Z 8703.

The liquid epoxy resin is not particularly limited as long as it is liquid at normal temperature, and may be, e.g., a bisphenol A type epoxy resin, a bisphenol F type epoxy resin, or a urethane-modified epoxy resin.

The blending amount of the liquid epoxy resin is preferably 160 parts by mass or less, more preferably 100 parts by mass or less, still more preferably 70 parts by mass or less with respect to 100 parts by mass of the solid epoxy resin. When the blending amount of the liquid epoxy resin is excessive, it becomes difficult to maintain the film shape.

The epoxy resin curing agent is not particularly limited as long as it is a thermosetting agent that starts curing by heat, and examples thereof include anionic curing agents such as amines and imidazoles, and cationic curing agents such as sulfonium salts. The curing agent may also be microencapsulated to provide resistance to the solvent used in the film formation.

Other Additives

In addition to the insulating binder and solder particles described above, the thermosetting connection material may be formulated with various additives conventionally used in heat-curable adhesives unless the additives do not impair the effects of the present invention. The particle size of the additive is preferably smaller than the average particle diameter of the solder particles, but is not particularly limited as long as the particle size does not interfere with the joining between terminals. For example, a spacer may be incorporated for balance adjustment. As the spacer, e.g., monodisperse silica (e.g., "Hyprecica" available from UBE EXSYMO) may be appropriately blended in accordance with the particle size of the solder.

The above-described thermosetting connection material can be formed, e.g., by mixing an insulating binder and solder particles in a solvent, applying the mixture into a predetermined thickness on a release-treated film by a bar coater, and then drying the mixture to volatilize the solvent. Further, after the mixture is applied on the release-treated film by a bar coater, a pressure may be applied in order for the mixture to have a predetermined thickness. Further, in order to increase the dispersibility of the solder particles, it is preferable to apply a high share in a state containing a solvent. For example, a known batch type planetary stirring machine can be used. The residual solvent amount of the thermosetting connection material is preferably 2% or less, more preferably 1% or less.

3. METHOD FOR MANUFACTURING CONNECTION BODY

The method for manufacturing the connection body according to the present embodiment includes: placing, on a substrate having a first terminal array, via a thermosetting connection material containing solder particles and a flux component, a connector having a bottom surface on which a second terminal array is arranged and a level difference canceling portion for canceling a level difference in the bottom surface is formed; and thermally curing the thermosetting connection material at a temperature equal to or higher than the melting point of the solder particles without pressing the connector, thereby connecting the first terminal array and the second terminal array. This method can cancel the level difference in the bottom surface, so that the terminal array can be made to have a fine pitch, and the connector can be miniaturized.

Referring now to FIGS. 8 to 12, step A of providing a thermosetting connection material on the first terminal array of the substrate, step B of placing the connector on the thermosetting connection material, and step C of joining the first terminal array of the substrate and the second terminal array of the connector by using a reflow furnace set to a temperature higher than the melting point of the solder particles will be described. The same reference numerals are given to the same structures as those of the connection body shown in FIG. 1, and the description thereof is omitted here.

Step A

Figure 8:
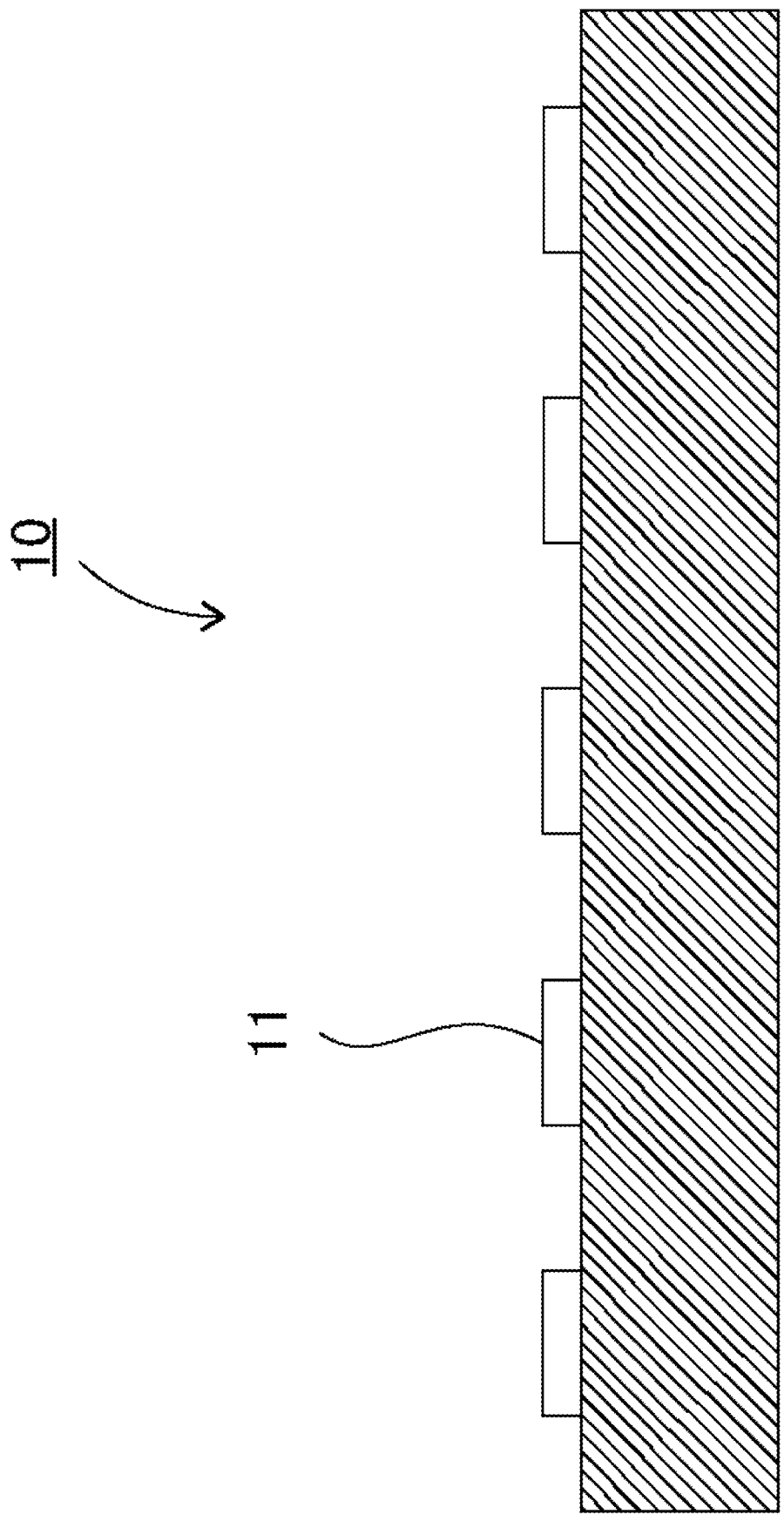
FIG. 8 is a cross-sectional view schematically illustrating an example of a substrate.
Figure 9:
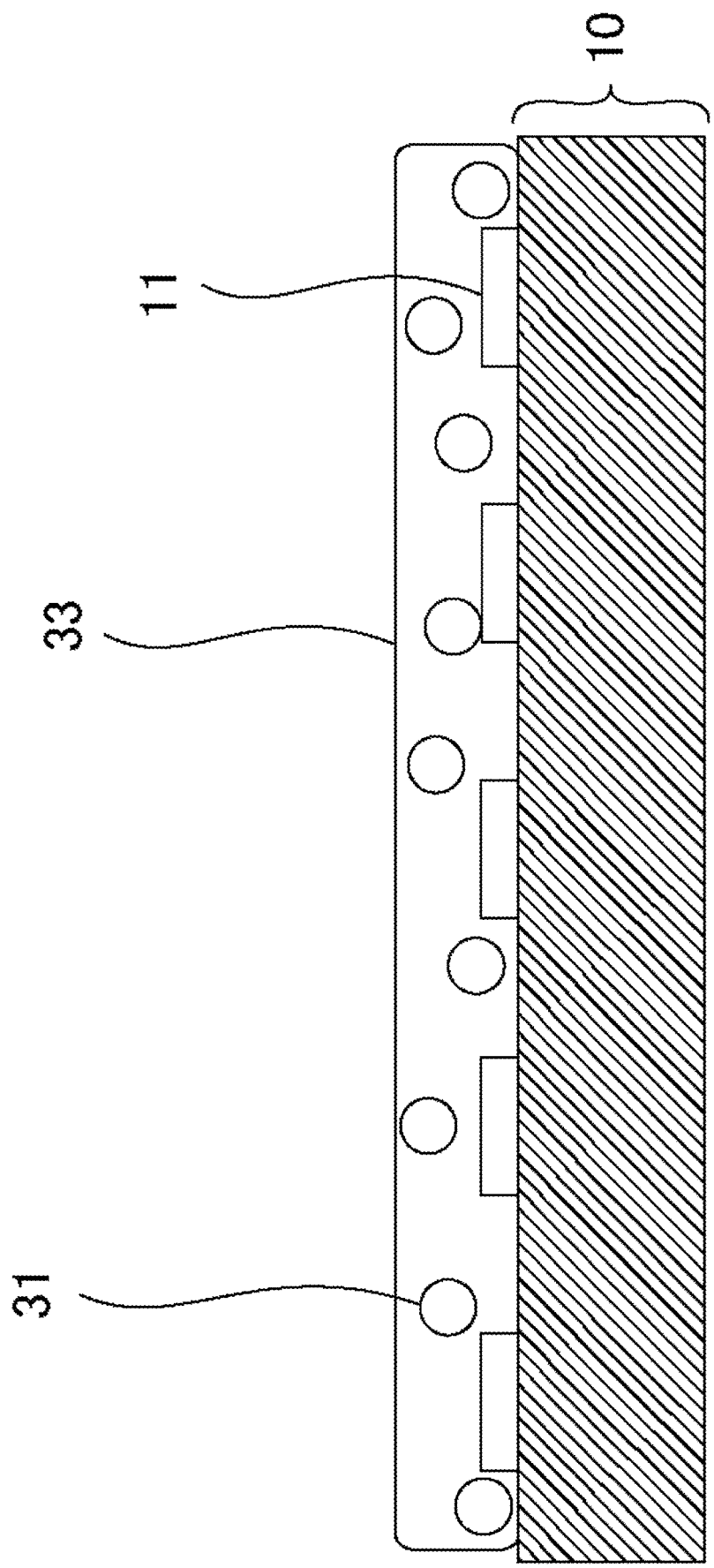
FIG. 9 is a cross-sectional view schematically illustrating a state in which a thermosetting connection material is provided on a terminal of a substrate.

FIG. 8 is a cross-sectional view schematically illustrating an example of a substrate, and FIG. 9 is a cross-sectional view schematically illustrating a state in which a thermosetting connection material is provided on a terminal of the substrate. As shown in FIGS. 8 and 9, in step A, a thermosetting connection material 33 containing solder particles 31 is provided on a first terminal array 11 of a substrate 10.

Step A may be a step of forming a thermosetting connection paste into a film on the substrate, may be a temporary pasting step of pasting a thermosetting connection film on the substrate at a low temperature, as used in conventional conductive films and anisotropic conductive films, or may be a laminating step of laminating a thermosetting connection film on the substrate.

When step A is a temporary bonding step, a thermosetting connection film can be provided on the substrate under known conditions. This case is economically advantageous because this requires only a minimum change such as installation or modification of a tool to or from the existing facility.

When the step A is a laminating step, a thermosetting connection film is laminated on the substrate by using, e.g., a pressure type laminator. The laminating step may be vacuum pressurized lamination step. Temporary pasting of a conventional conductive film or an anisotropic conductive film using a heating/pressing tool will limit the width of the film by the width of the tool, while laminating step uses no heating/pressing tool so that it is expected that a relatively wide width can be mounted at once.

In step A, the lower limit of the ratio of the average particle diameter of the solder particles to the thickness of the thermosetting connection material is preferably 0.6 or more, more preferably 0.8 or more, and still more preferably 0.9 or more, as described above. This range facilitates the holding of the solder particles between the terminals and works with a fine pitch terminal array.

Step B

Figure 10:
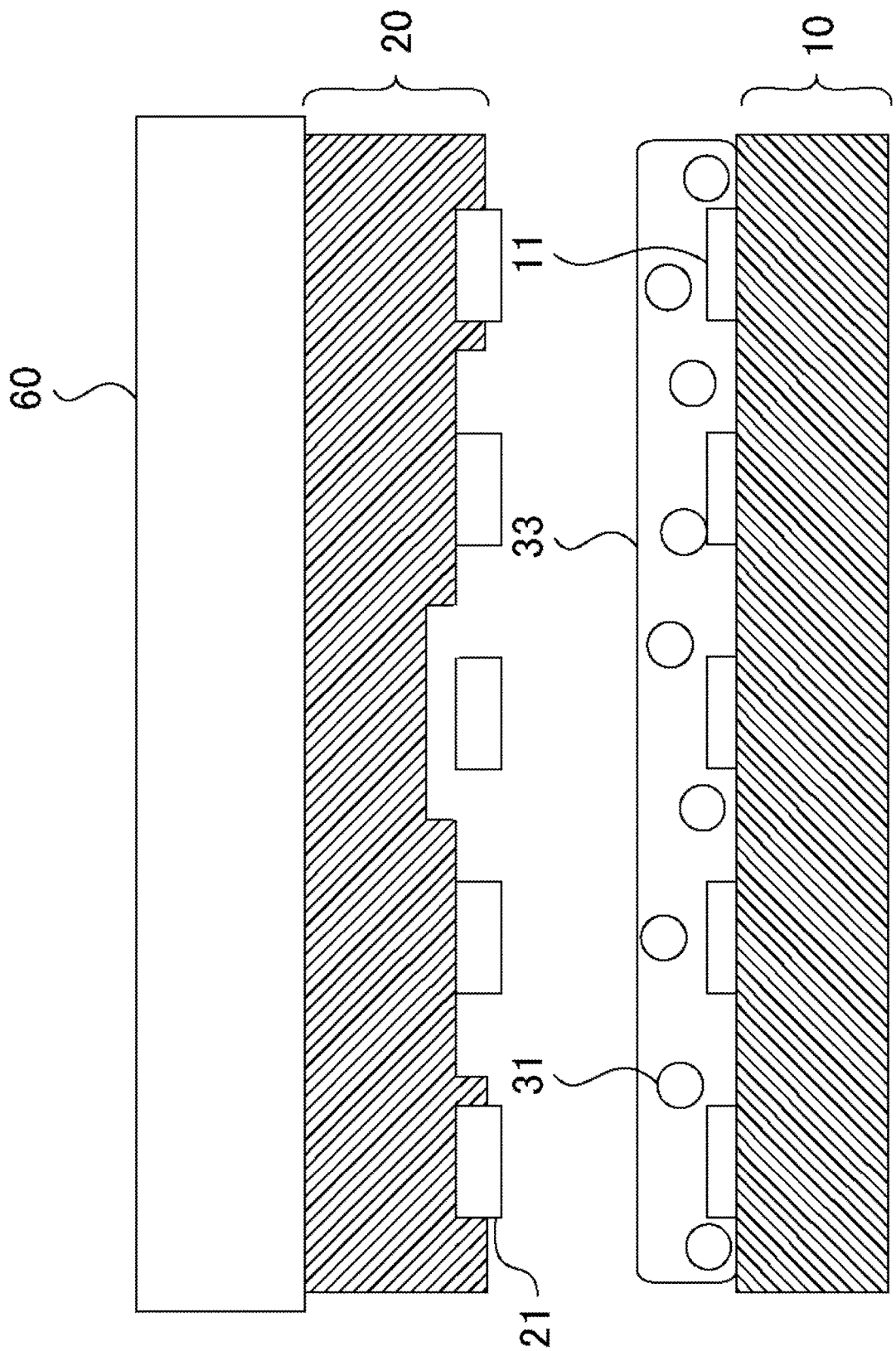
FIG. 10 is a cross-sectional view schematically illustrating alignment of a terminal array of a substrate and a terminal array of a connector.

FIG. 10 is a cross-sectional view schematically illustrating alignment of the terminal array of the substrate and the terminal array of the connector. As shown in FIG. 10, in step B, by using, e.g., a tool 60, the terminal array 11 of the substrate 10 is aligned with the terminal array 21 of the connector 20 to place the connector 20 on the thermosetting connection material 30. The tool 60 preferably includes a suction mechanism for sucking the connector 20. Since self-alignment by solder is not expected in this technology, it is desirable in step B that the connector 20 is accurately aligned and then fixed by the thermosetting connection material 33.

Step C

Figure 11:
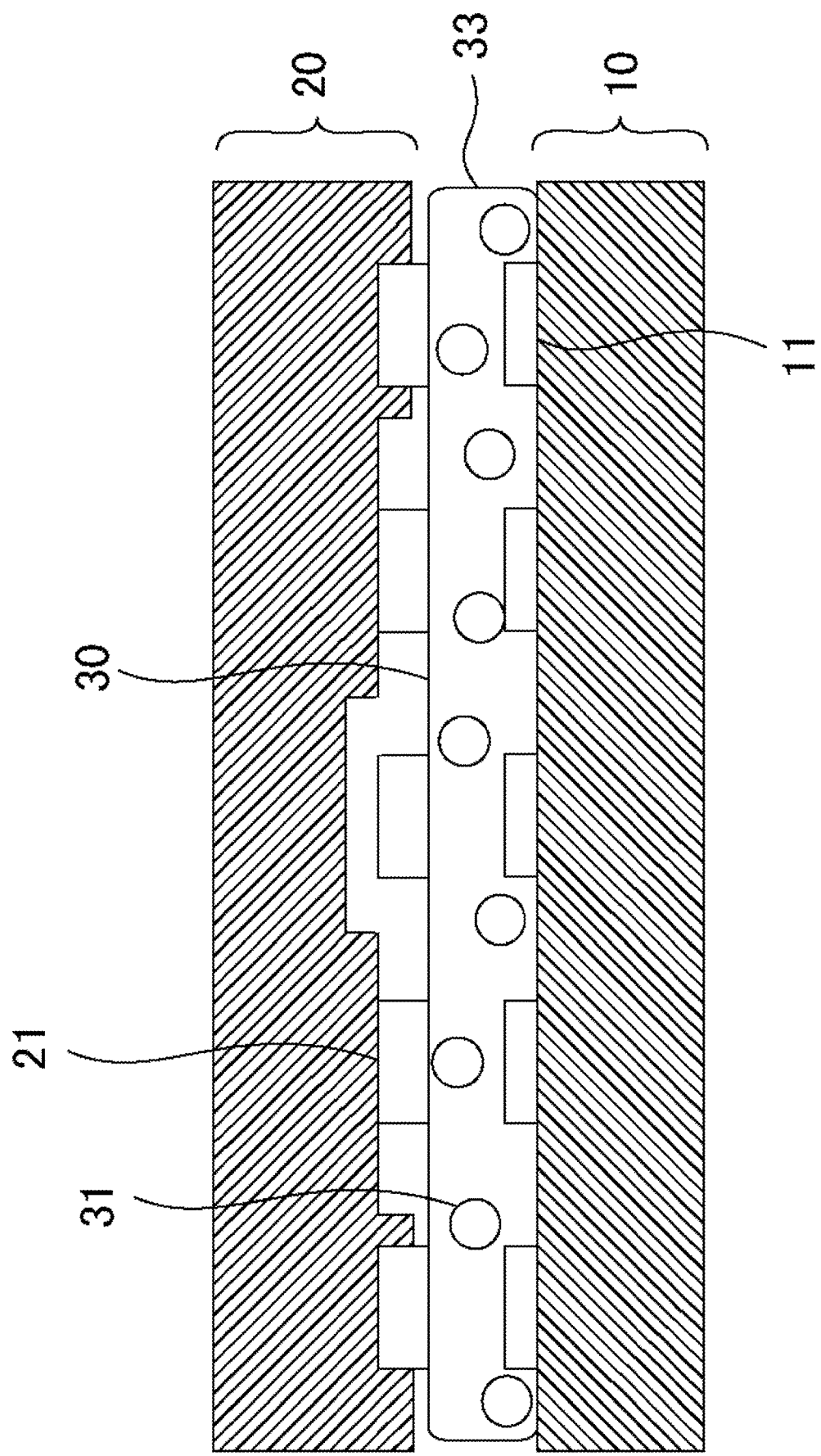
FIG. 11 is a cross-sectional view schematically illustrating a state in which a connector is placed on a substrate.
Figure 12:
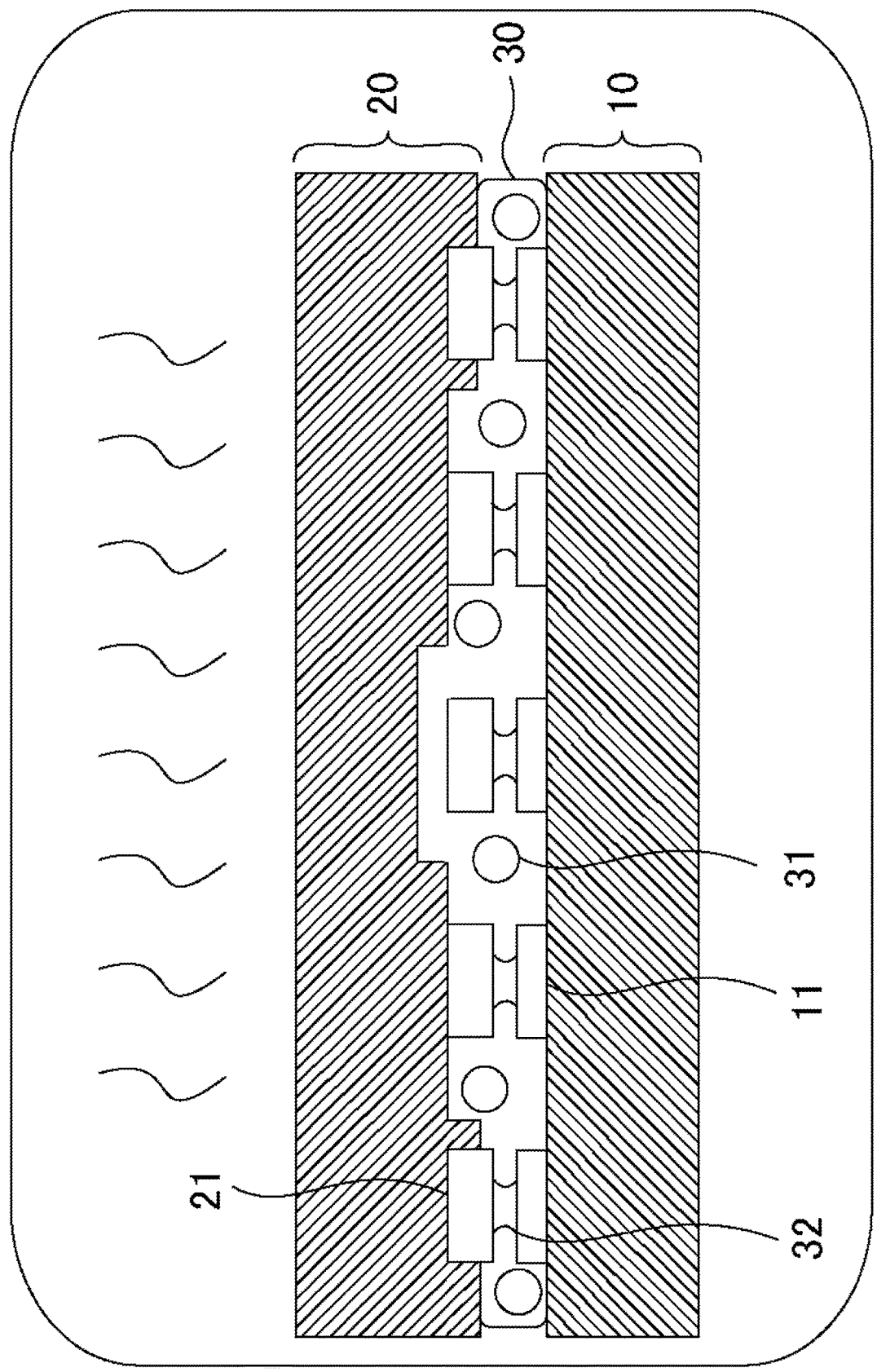
FIG. 12 is a cross-sectional view schematically illustrating a state in which a substrate and a connector are heated in a reflow furnace.

FIG. 11 is a cross-sectional view schematically illustrating a state in which the connector is placed on the substrate, and FIG. 12 is a cross-sectional view schematically illustrating a state in which the substrate and the connector are heated in a reflow furnace. As shown in FIGS. 11 and 12, in step C, the first terminal array 11 of the substrate 10 and the second terminal array 21 of the connector 20 are joined by using a reflow furnace set to a temperature equal to or higher than the melting point of the solder particles 31.

Since the reflow furnace can heat-bond the substrate 10 and the connector 20 without a load without applying mechanical pressure, damage to the substrate 10 and the connector 20 can be suppressed. In addition, joint without load is expected to reduce the amount of movement of the solder particles, thereby working with a fine pitch terminal array.

The reflow furnace is preferably an atmospheric pressure reflow furnace from the viewpoint of simplicity, but any one of an atmospheric pressure reflow, a vacuum reflow, an atmospheric pressure oven, and an autoclave (pressurized oven) may be used.

The lower limit of the peak temperature (maximum reaching temperature) in the reflow furnace may be the temperature at which the solder particles melt and the temperature at which the thermosetting binder begins to cure, and is preferably 150° C. or more, more preferably 180° C. or more, and still more preferably 200° C. or more. The upper limit of the peak temperature in the reflow furnace is 300° C. or less, more preferably 290° C. or less, sill more preferably 280° C. or less. Thus, the first terminal array 11 of the substrate 10 and the second terminal array 21 of the connector 20 can be joined at the solder-joint portion 32.

The method for manufacturing the connection body of the present embodiment can cancel the level difference in the bottom surface, so that the terminal array can be made to have a fine pitch, and the connector can be miniaturized. When the thermosetting connection material is a thermosetting binder, it is possible to optimize resin melting, holding of solder particles between terminals, and solder melting and resin curing in the reflow process by matching the temperature raising, the temperature keeping, and the temperature lowering in the reflow process with the thermosetting behavior of the thermosetting connection material. The thermosetting behavior of the thermosetting connection material can be known by DSC measurement or viscosity measurement by a rheometer.

4. CONNECTOR

Next, a terminal structure of a connector according to the present technology will be described. Conventional connectors have a structure in which terminal arrays are extend from the inside to the outside of the connector for the purpose of surface mounting by solder. This will form an open end called a stub, which might adversely affect frequency characteristics. For example, an open end may have a length with a frequency characteristic that resonates at a frequency of ¼ wavelength to make the signal level at that frequency to zero.

In the connector according to the present technology, the terminal arrays need not extend outward from the bottom surface, which increases the degree of freedom of the terminal structure and enable the selection of a terminal structure excellent in high frequency characteristics. The combination of the terminal structure of the plug and receptacle was simulated and evaluated by S-parameter (Scattering parameters).

Figure 13:
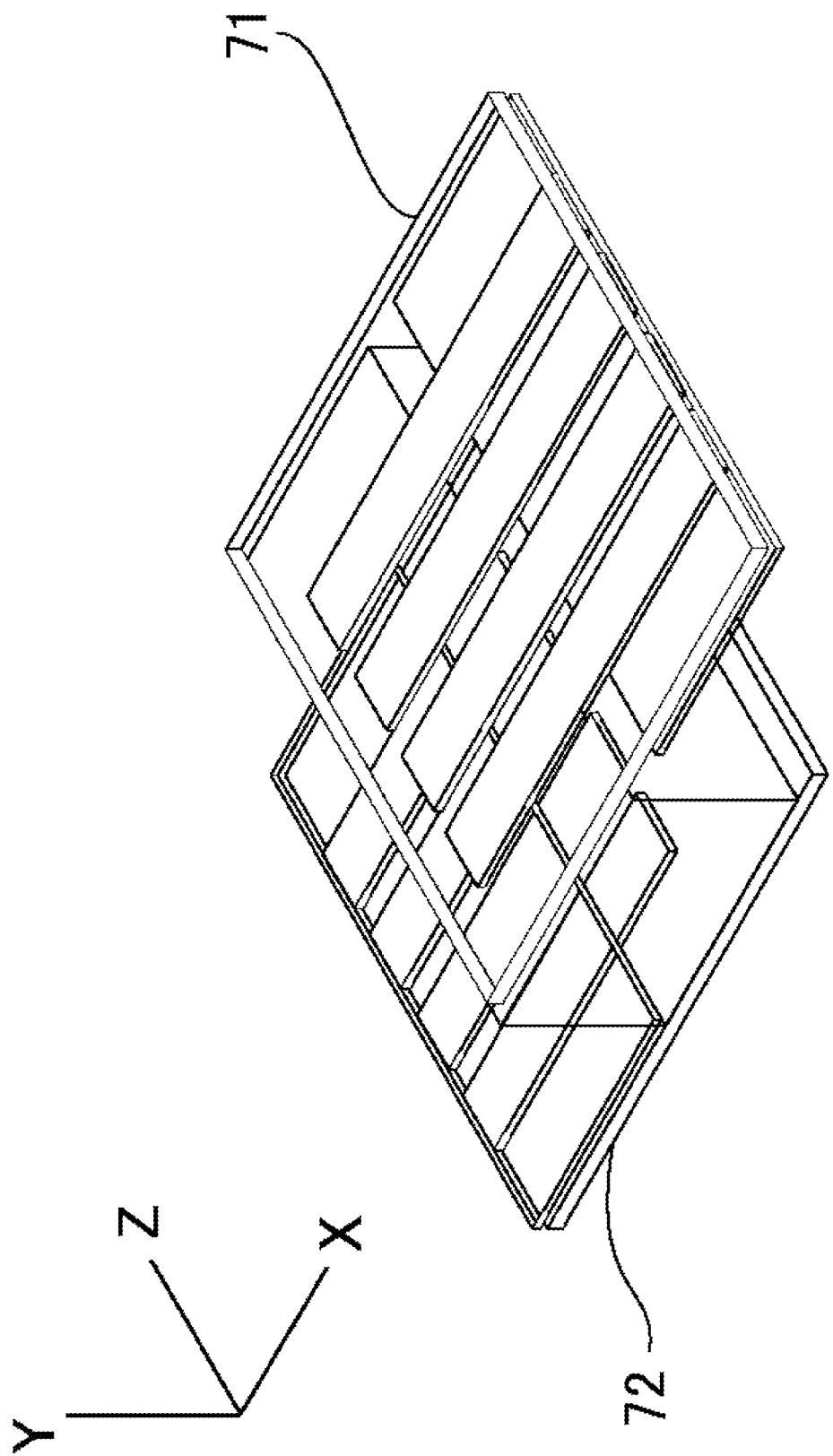
FIG. 13 is a perspective view illustrating a connector structure used in a simulation.
Figure 14:
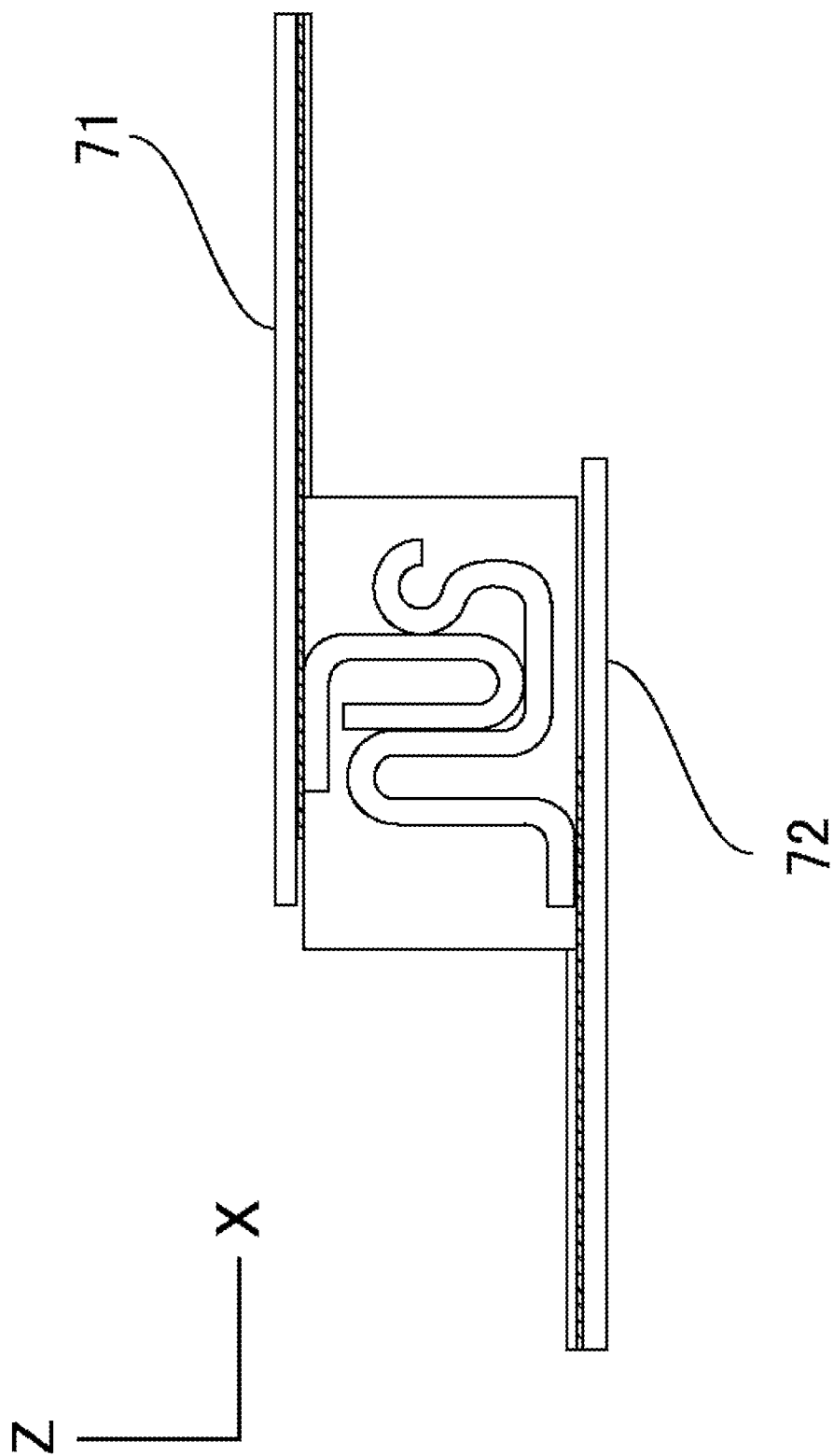
FIG. 14 is a cross-sectional view illustrating an example of a connector structure used in a simulation.
Figure 15:
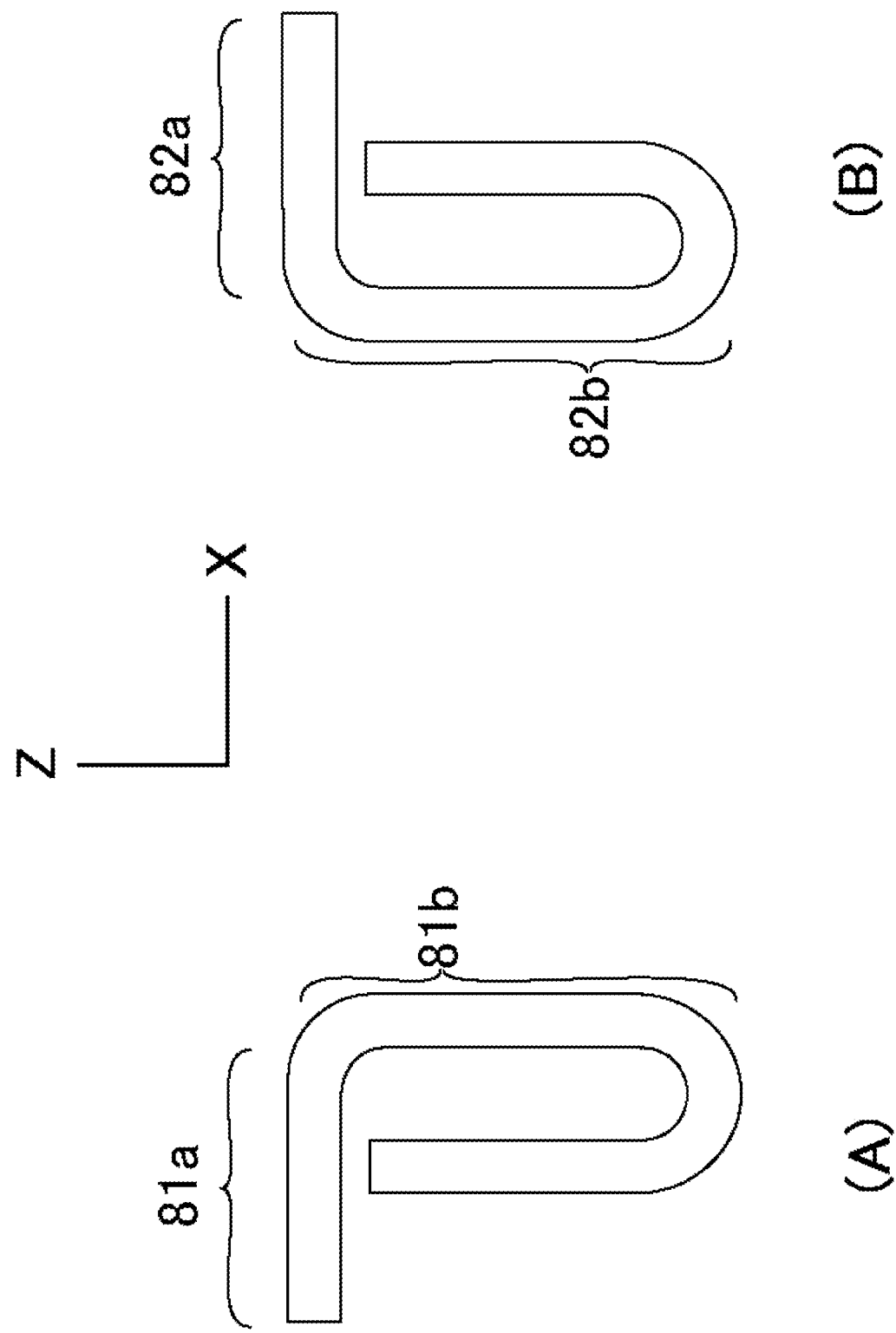
FIG. 15A is a cross-sectional view illustrating a first plug configuration example (Plug-1)
FIG. 15B is a cross-sectional view illustrating a second plug configuration example (Plug-2).
Figure 16:
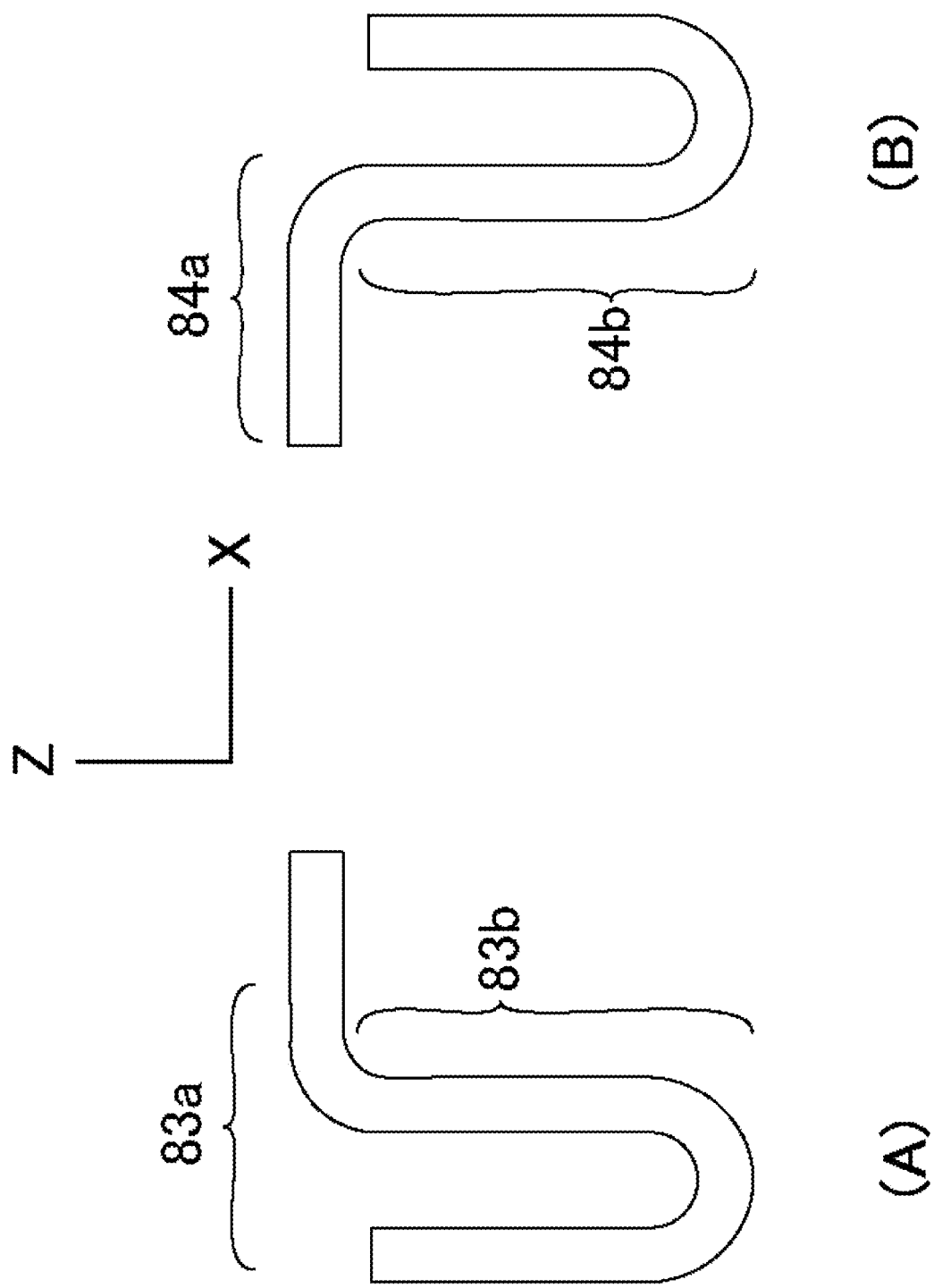
FIG. 16A is a cross-sectional view illustrating a third plug configuration example (Plug-3)
FIG. 16B is a cross-sectional view illustrating a fourth plug configuration example (Plug-4).
Figure 17:
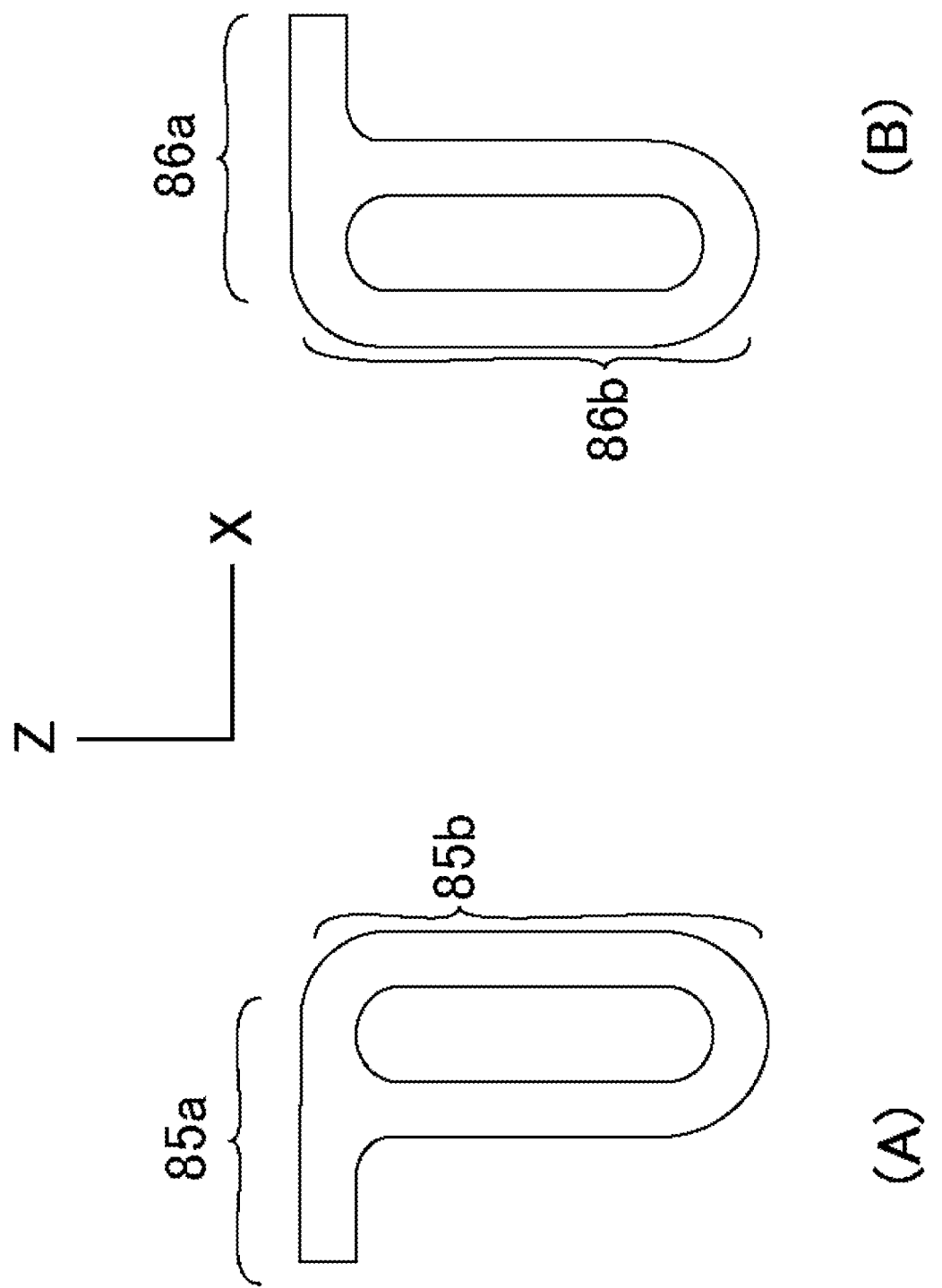
FIG. 17A is a cross-sectional view illustrating a first loop plug configuration example (Plug-1 Loop)
FIG. 17B is a cross-sectional view illustrating a second loop plug configuration example (Plug-2 Loop).
Figure 18:
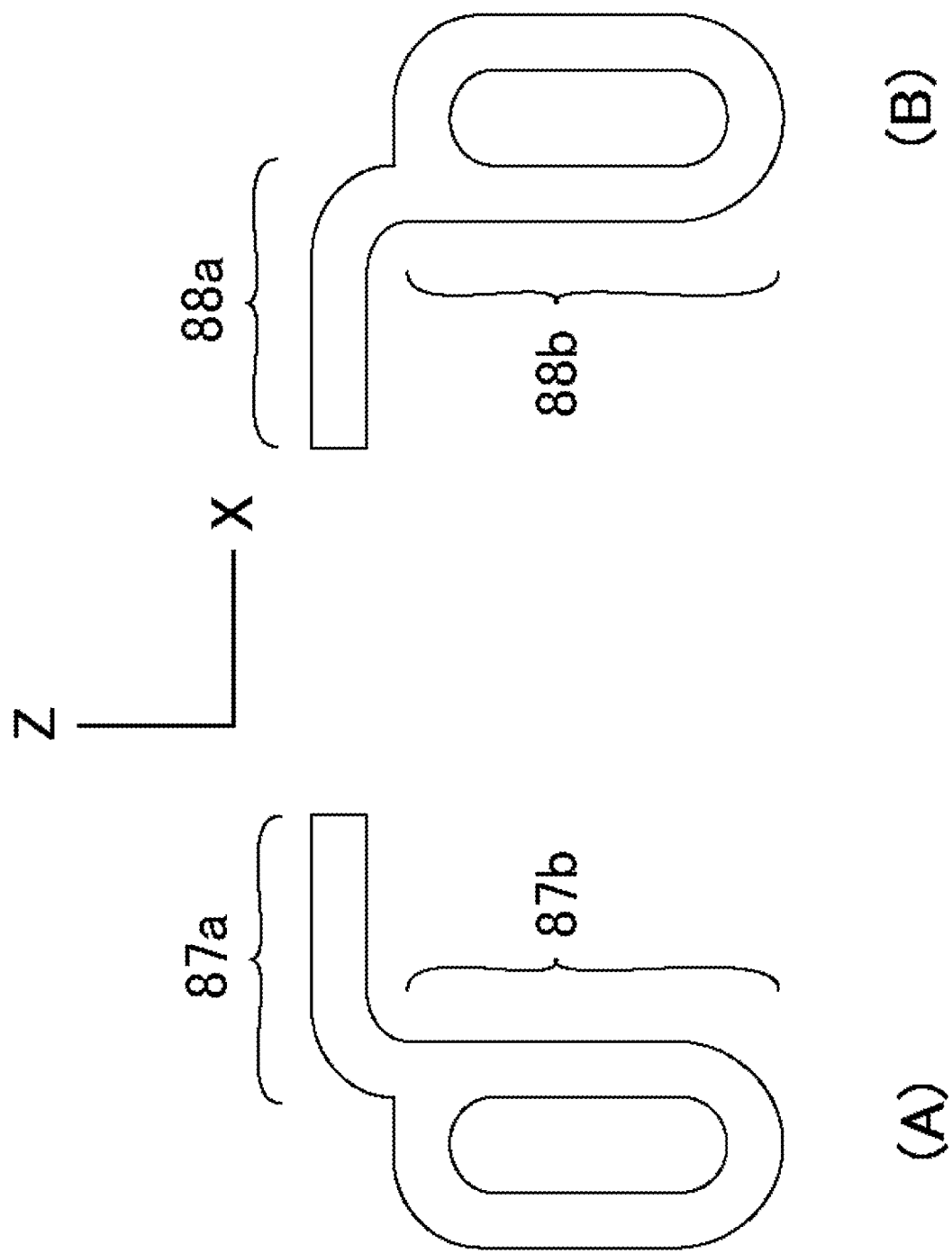
FIG. 18A is a cross-sectional view illustrating a third loop plug configuration example (Plug-3 Loop)
FIG. 18B is a cross-sectional view illustrating a fourth loop plug configuration example (Plug-4 Loop).

FIG. 13 is a perspective view illustrating the connector structure used in the simulation, and FIG. 14 is a cross-sectional view illustrating an example of the connector structure used in the simulation. The wiring board model was FPC (Flexible Printed Circuits) with cover lay with a wiring pitch of 0.35 mm and a wiring thickness of 18 μm, and the wiring width was optimized. The wiring width with an impedance of 100Ω is 0.25 mm.

As shown in FIGS. 13 and 14, a case where a plug is mounted on the first FPC 71 and a receptacle is mounted on the second FPC 72 in a connector connection using a coplanar differential line was simulated. The plug was selected from the shapes shown in FIGS. 15 to 18, the receptacle was selected from the shapes shown in FIGS. 19 to 22, and the effect of the combination of the plug and the receptacle on the transmission characteristics was evaluated by the transmission signal S21 and the reflection signal S11.

The transmission signal S21 is a signal that is transmitted to the terminal B of the second FPC 72 when a signal is input from the terminal A of the first FPC 71, and the absolute value in decibel indicates the insertion loss from the terminal A to the terminal B. The reflection signal S11 is a signal reflected to the terminal A when a signal is input from the terminal A of the first FPC 71, and the absolute value in decibel indicates the reflection loss (return loss) of the terminal A.

FIG. 15A is a cross-sectional view illustrating a first plug configuration example (Plug-1), and FIG. 15B is a cross-sectional view illustrating a second plug configuration example (Plug-2). The first plug configuration example includes: a connecting portion 81a which extends linearly from a first end portion in a horizontal direction (X-axis direction) and is to be connected to the wiring; and a male vertical fitting portion 81b which bends from the connecting portion 81a in a vertical direction (Y-axis direction), extends linearly, extends inward of the connecting portion 81a to form a semicircular shape, and ends at a second end portion.

The second plug configuration example is bilaterally symmetrical to the first plug configuration example and includes: a connecting portion 82a which extends linearly from a first end portion in a horizontal direction (X-axis direction) and is to be connected to the wiring; and a male vertical fitting portion 82b which bends from the connecting portion 82a in a vertical direction (Y-axis direction), extends linearly, extends inward of the connecting portion 82a to form a semicircular shape, and ends at a second end portion. The first plug configuration example is mounted in such a manner that the direction of the end portion of the wiring of the first FPC 71 is aligned with the direction of the first end portion, and the second plug configuration example is mounted in such a manner that the direction of the end portion of the wiring of the first FPC 71 is aligned with the opposite direction of the first end portion.

FIG. 16A is a cross-sectional view illustrating a third plug configuration example (Plug-3), and FIG. 16B is a cross-sectional view illustrating a fourth plug configuration example (Plug-4). The third plug configuration example includes: a connecting portion 83a which extends linearly from a first end portion in a horizontal direction (X-axis direction) and is to be connected to the wiring; and a male vertical fitting portion 83b which bends from the connecting portion 83a in a vertical direction (Y-axis direction), extends linearly, extends outward of the connecting portion 83a to form a semicircular shape, and ends at a second end portion. The fourth plug configuration example is bilaterally symmetrical to the third plug configuration example and includes: a connecting portion 84a which extends linearly from a first end portion in a horizontal direction (X-axis direction) and is to be connected to the wiring; and a male vertical fitting portion 84b which bends from the connecting portion 84a in a vertical direction (Y-axis direction), extends linearly, extends outward of the connecting portion 84a to form a semicircular shape, and ends at a second end portion. In other words, the third and fourth plug configuration examples are respectively configured by extending the semicircular shape of the first and second plug configuration examples outward of the connecting portion 83a. The third plug configuration example is mounted in such a manner that the direction of the end portion of the wiring of the first FPC 71 is aligned with the opposite direction of the first end portion, and the fourth plug configuration example is mounted in such a manner that the direction of the end portion of the wiring of the first FPC 71 is aligned with the direction of the first end portion.

FIG. 17A is a cross-sectional view illustrating a first loop plug configuration example (Plug-1 Loop), and FIG. 17B is a cross-sectional view illustrating a second loop plug configuration example (Plug-2 Loop). The first loop plug configuration example includes: a connecting portion 85a which extends linearly from a first end portion in a horizontal direction (X-axis direction) and is to be connected to the wiring; and a male vertical fitting portion 85b which bends from the connecting portion 85a in a vertical direction (Y-axis direction), extends linearly, extends inward of the connecting portion 85a to form a semicircular shape, and is connected to the connecting portion 85a to form a semicircular shape. The second loop plug configuration example is bilaterally symmetrical to the first loop plug configuration example and includes: a connecting portion 86a which extends linearly in a horizontal direction (X-axis direction) from a first end portion and is to be connected to the wiring; and a male vertical fitting portion 86b which bends from the connecting portion 86a in a vertical direction (Y-axis direction), extends linearly, extends inward of the connecting portion 86a to form a semicircular shape, and is connected to the connecting portion 86a to form a semicircular shape. In other words, the first loop plug configuration example and the second loop plug configuration example are respectively configured by connecting the second end portion of the first plug configuration example and the second plug configuration example to the connecting portion to form a semicircular shape. The first loop plug configuration example is mounted in such a manner that the direction of the end portion of the wiring of the first FPC 71 is aligned with the direction of the first end portion, and the second loop plug configuration example is mounted in such a manner that the direction of the end portion of the wiring of the first FPC 71 is aligned with the opposite direction of the first end portion.

FIG. 18A is a cross-sectional view illustrating a third loop plug configuration example (Plug-3 Loop) of the plug, and FIG. 18B is a cross-sectional view illustrating a fourth loop plug configuration example (Plug-4 Loop). The third loop plug configuration example includes: a connecting portion 87a which extends linearly from a first end portion in a horizontal direction (X-axis direction) and is to be connected to the wiring; and a male vertical fitting portion 86b which bends from the connecting portion 87a in a vertical direction (Y-axis direction), extends linearly, extends outward of the connecting portion 86a to form a semicircular shape, and is connected to the connecting portion 86a to form a semicircular shape. The fourth loop plug configuration example is bilaterally symmetrical to the third loop plug configuration example and includes: a connecting portion 88a which extends linearly from a first end portion in a horizontal direction (X-axis direction) and is to be connected to the wiring; and a male vertical fitting portion 88b which bends from the connecting portion 88a in a vertical direction (Y-axis direction), extends linearly, extends outward of the connecting portion 88a to form a semicircular shape and is connected to the connecting portion 88a to form a semicircular shape. In other words, the third loop plug configuration example and the fourth loop plug configuration example are respectively configured by connecting the second end portion of the third plug configuration example and the fourth plug configuration to the connecting portion to form a semicircular shape. The third loop plug configuration example is mounted in such a manner that the direction of the end portion of the wiring of the first FPC 71 is aligned with the opposite direction of the first end portion, and the fourth loop plug configuration example is mounted in such a manner that the direction of the end portion of the wiring of the first FPC 71 is aligned with the direction of the first end portion.

Figure 19:
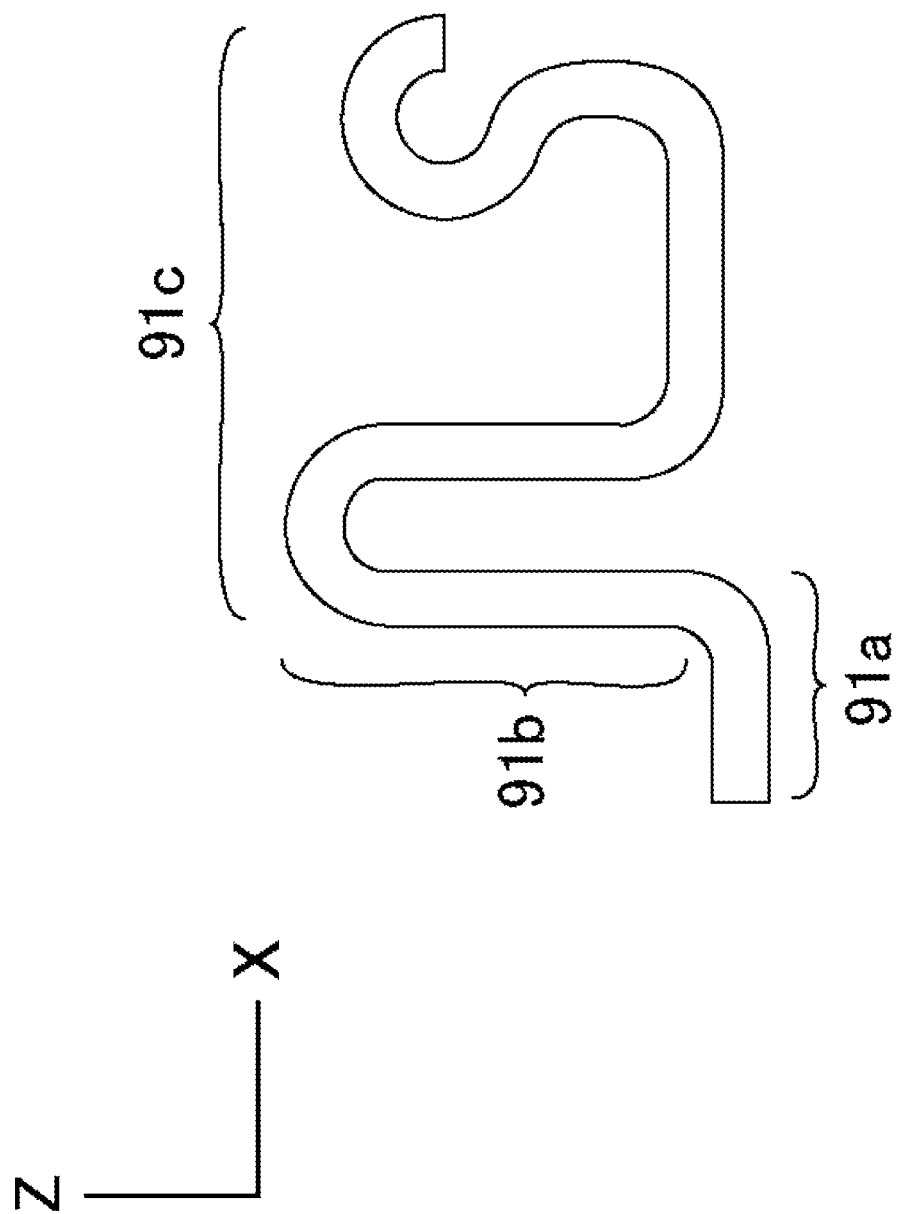
FIG. 19 is a cross-sectional view illustrating a first receptacle configuration example (Receptacle-0).

FIG. 19 is a cross-sectional view illustrating a first receptacle configuration example (Receptacle-0). The first receptacle configuration example includes: a connecting portion 91a which extends linearly from a first end portion in a horizontal direction (X-axis direction) and is to be connected to the wiring; a vertical portion 91b which bends from the connecting portion 91a in a vertical direction (Y-axis direction) and extends linearly; and a female vertical fitting portion 91c which extends linearly from the vertical portion 91b to form a semicircular shape in a vertical direction (Y-axis direction) outward of the connecting portion 91a, bends outward in a horizontal direction (X-axis direction), extends linearly, bends inward again in a vertical direction (Y-axis direction), bends inward, and ends at a second end portion to form a semicircular shape. The first receptacle configuration example is mounted in such a manner that the direction of the end portion of the wiring of the second FPC 72 is aligned with the opposite direction of the first end portion.

Figure 20:
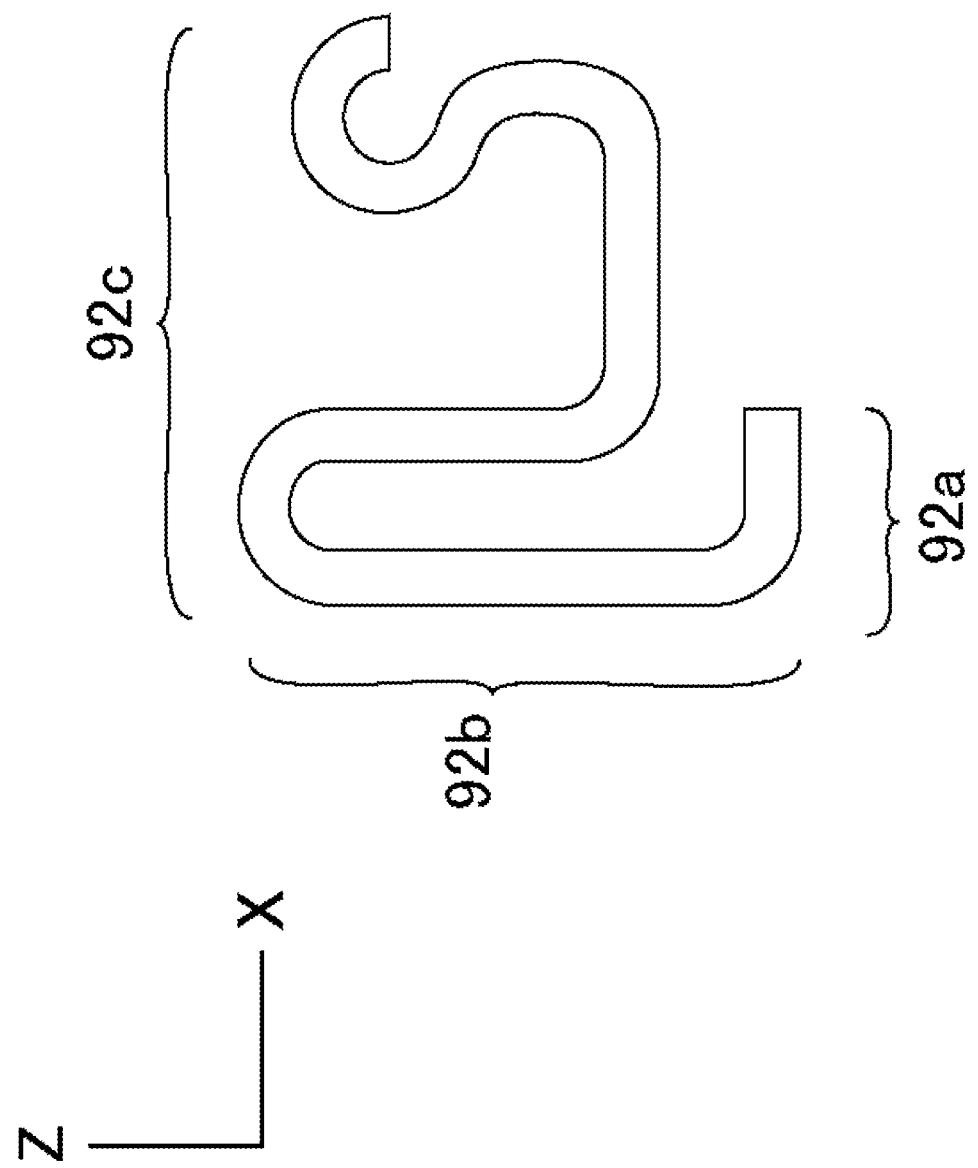
FIG. 20 is a cross-sectional view illustrating a second receptacle configuration example (Receptacle-1).

FIG. 20 is a cross-sectional view illustrating a second receptacle configuration example (Receptacle-1). The second receptacle configuration example includes: a connecting portion 92a which extends linearly from a first end portion in a horizontal direction (X-axis direction) and is to be connected to the wiring; a vertical portion 92b which bends from the connecting portion 92a in a vertical direction (Y-axis direction) and extends linearly; and a female vertical fitting portion 92c which extends linearly from the vertical portion 92b to form a semicircular shape in a vertical direction (Y-axis direction) inward of the connecting portion 92a, bends outward in a horizontal direction (X-axis direction), extends linearly, bends inward again in a vertical direction (Y-axis direction), and bends inward, and ends at a second end portion to form a semicircular shape. In other words, the second receptacle configuration example is configured by bending the connecting portion of the first configuration example toward the female vertical fitting portion side. The second receptacle configuration example is mounted in such a manner that the direction of the end portion of the wiring of the second FPC 72 is aligned with the direction of the first end portion.

Figure 21:
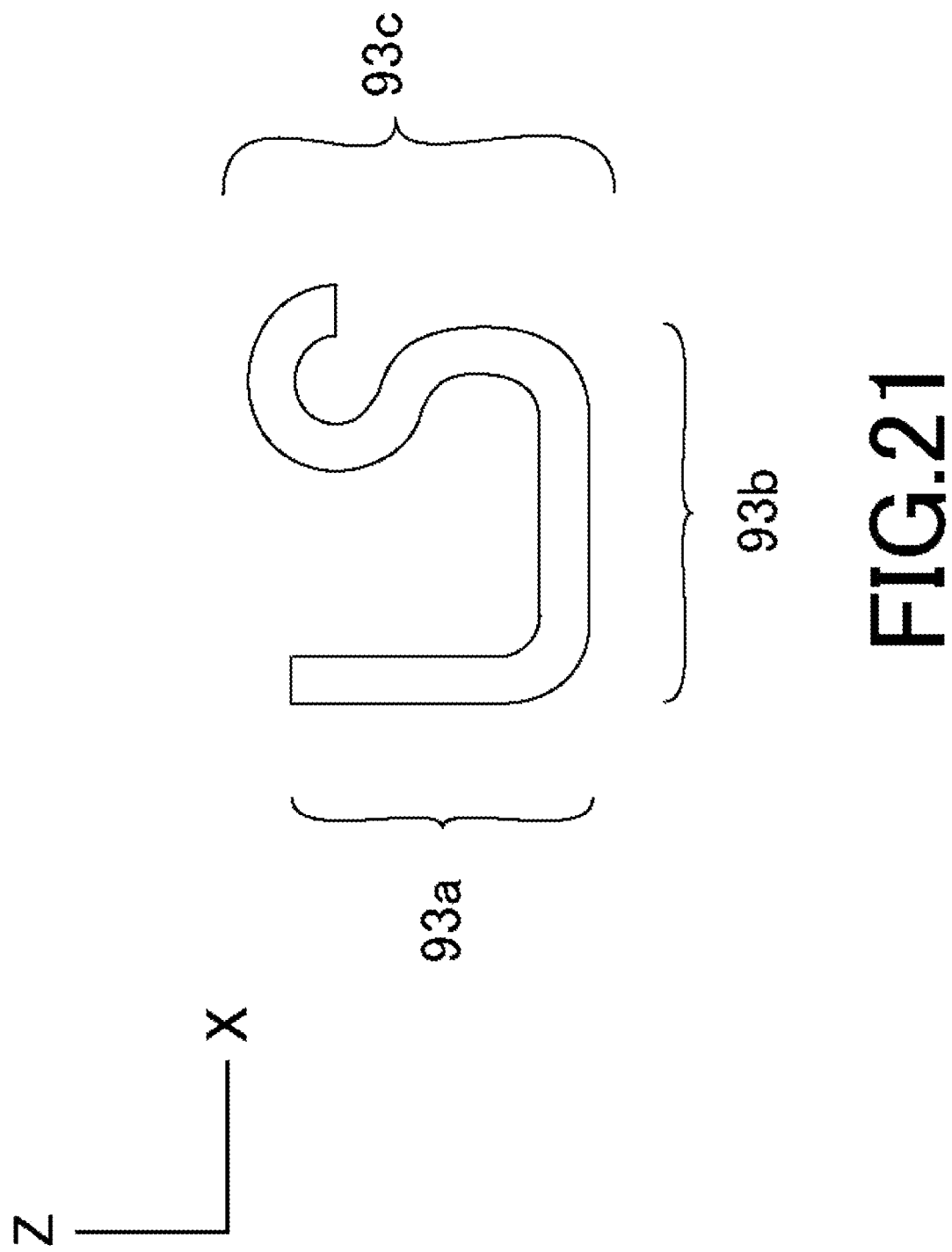
FIG. 21 is a cross-sectional view illustrating a third receptacle configuration example (Receptacle-2).

FIG. 21 is a cross-sectional view illustrating a third receptacle configuration example (Receptacle-2). The third receptacle configuration example includes: a vertical portion 93a which extends linearly from a first end in a vertical direction (Y-axis direction), a connecting portion 93b which bends from the vertical portion 93a in a horizontal direction (X-axis direction), extends linearly, and is to be connected to the wiring; and a female vertical fitting portion 93c which bends from the connecting portion 93b inward in a vertical direction (Y-axis direction), further bends inward, ends at a second end portion to form a semicircular shape, and includes the vertical portion 93a and the connecting portion 93b as components. The third receptacle configuration example is mounted in such a manner that the vertical portion 93a is located inside with respect to the direction of the end portion of the wiring of the second FPC 72.

Figure 22:
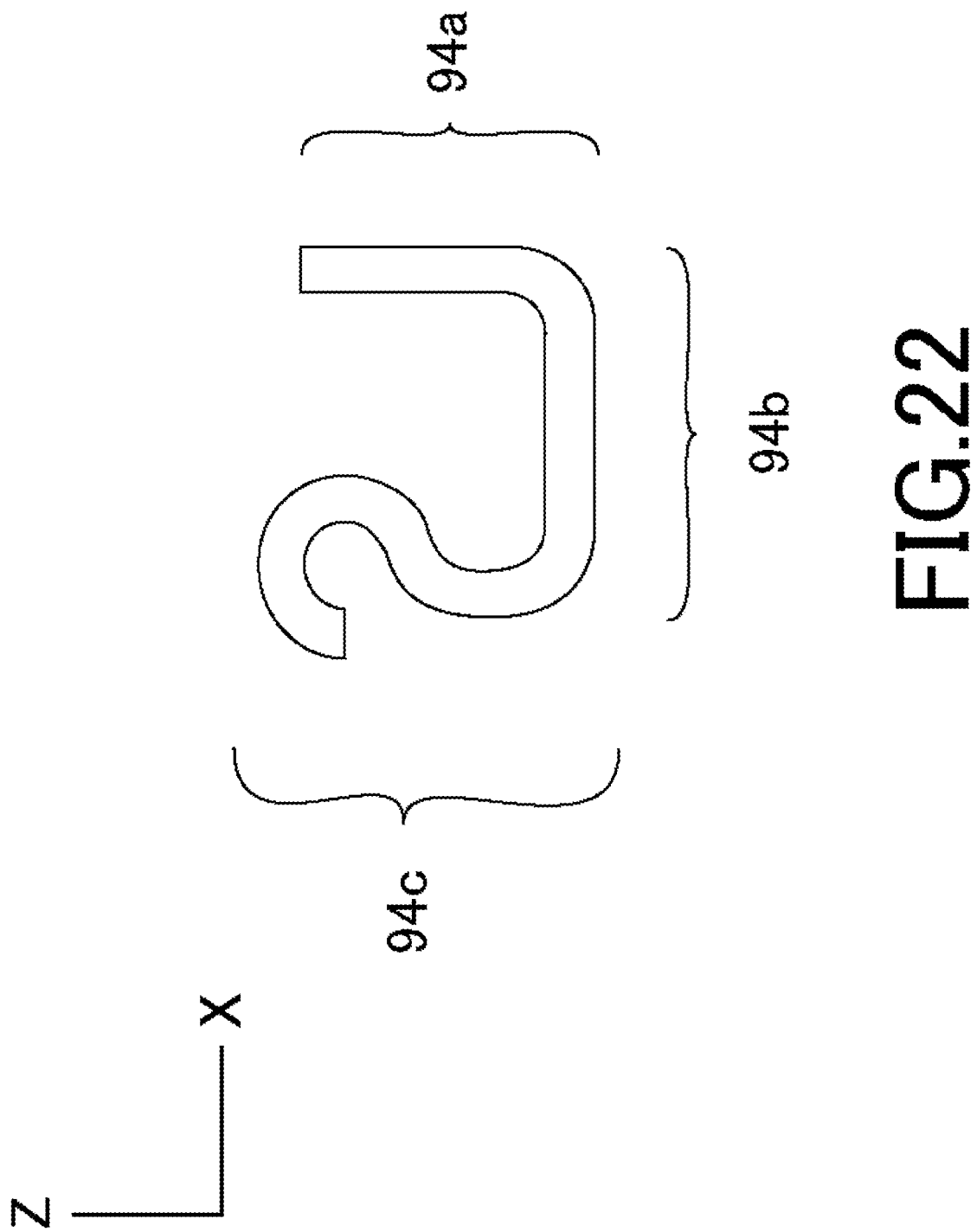
FIG. 22 is a cross-sectional view illustrating a fourth receptacle configuration example (Receptacle-3).

FIG. 22 is a cross-sectional view illustrating a fourth receptacle configuration example (Receptacle-3). The fourth receptacle configuration example is bilaterally symmetrical to the third receptacle configuration example and includes: a vertical portion 94a which extends linearly from a first end portion in the vertical direction (Y-axis direction), a connecting portion 94b which bends from the vertical portion 94a in the horizontal direction (X-axis direction), extends linearly, and is to be connected to the wiring; and a female vertical fitting portion 94c which bends from the connecting portion 94b inward in the vertical direction (Y-axis direction), further bends inward, ends at a second end portion to form a semicircular shape, and includes the vertical portion 94a and the connecting portion 94b as components. The fourth receptacle configuration example is mounted in such a manner that the vertical portion 94a is located outside with respect to the direction of the end portion of the wiring of the second FPC 72.

High Frequency Characteristics of First Plug Configuration Example to Fourth Plug Configuration Example (Plug-1 to Plug-4)

Figure 23:
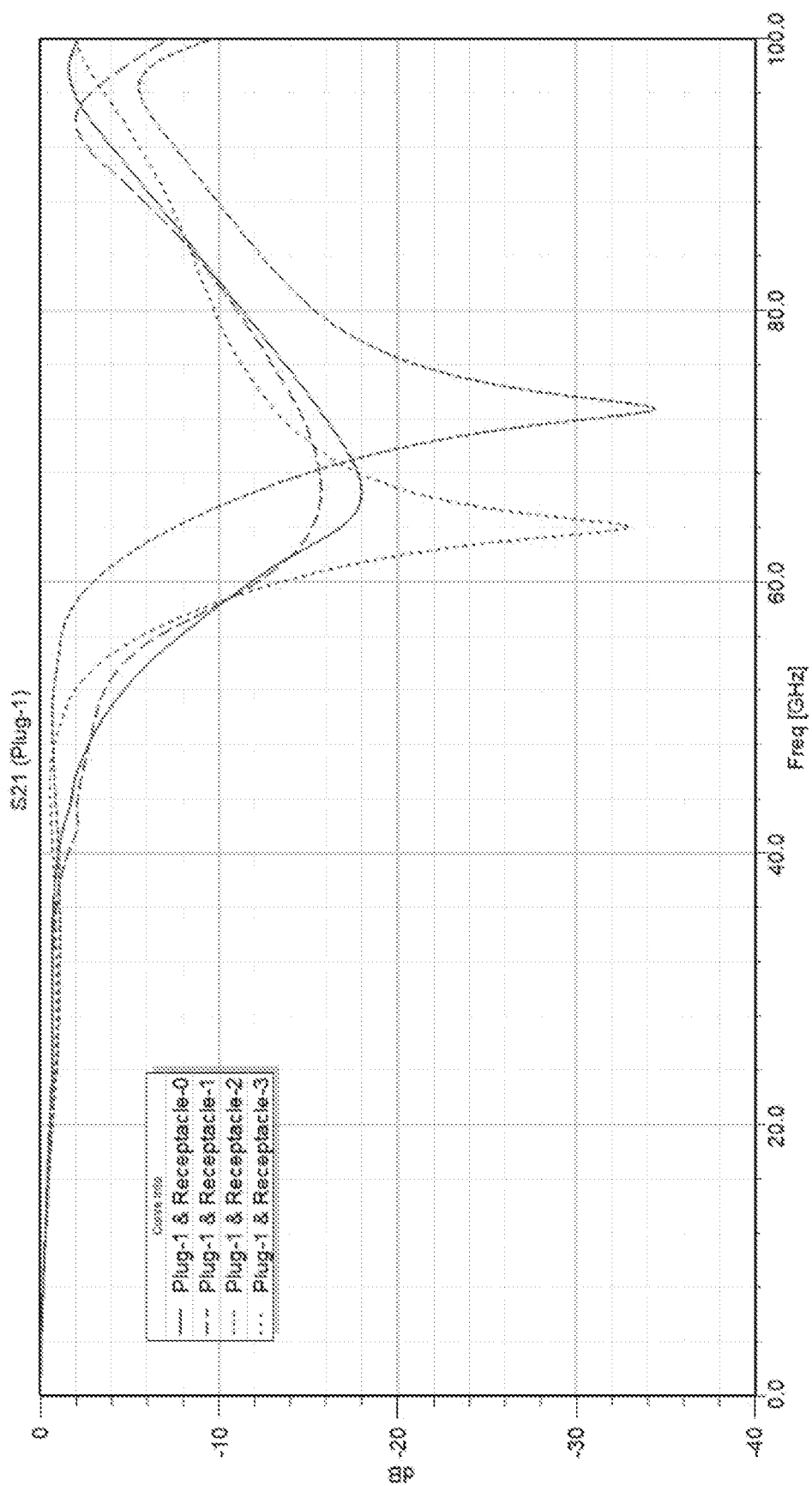
FIG. 23 is a graph representing the transmission signal S21 when the first plug configuration example (Plug-1) is connected to the first to fourth receptacle configuration examples (Receptacle-0 to Receptacle-3).
Figure 24:
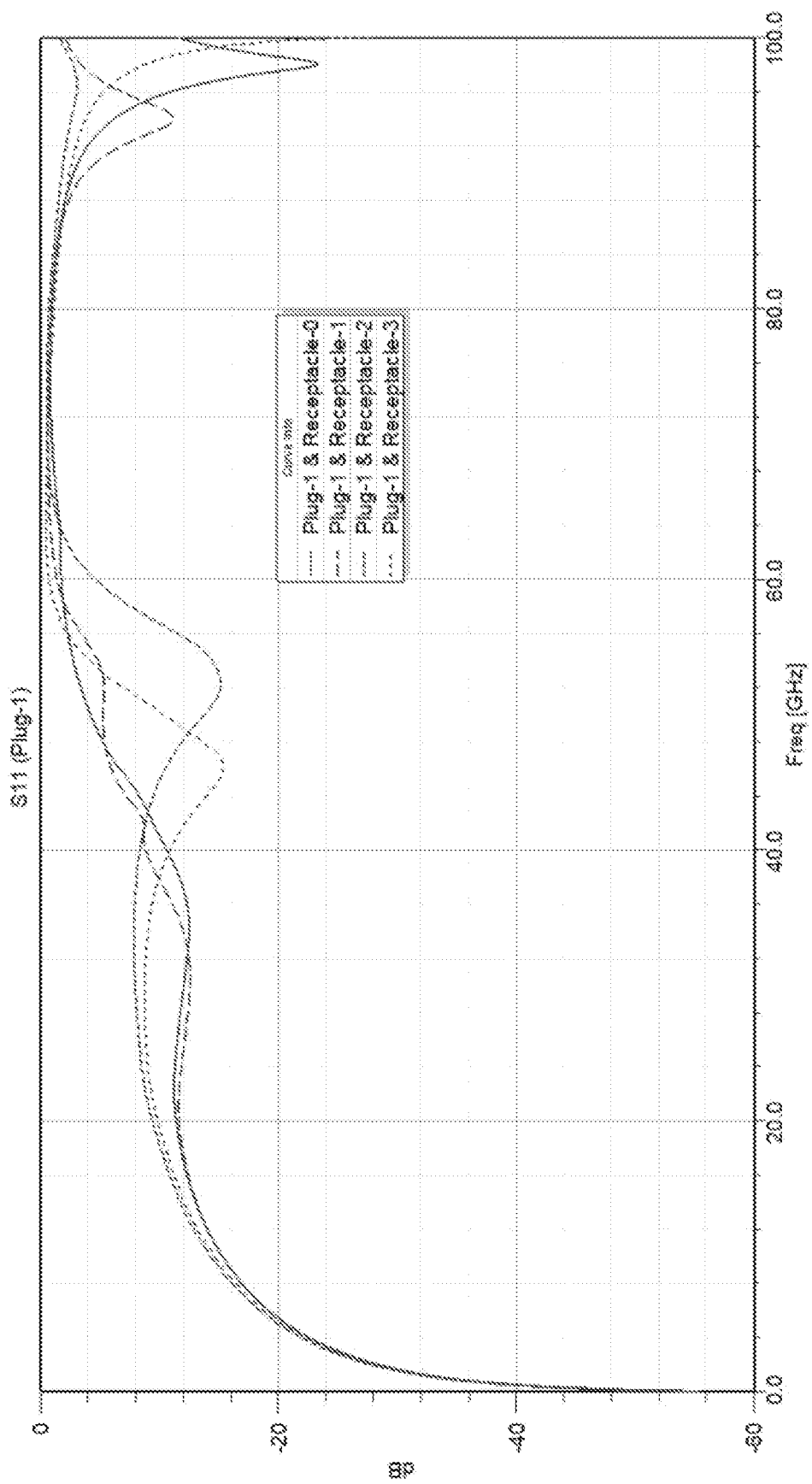
FIG. 24 is a graph representing the reflection signal S11 when the first plug configuration example (Plug-1) is connected to the first to fourth receptacle configuration examples (Receptacle-0 to Receptacle-3).

FIG. 23 is a graph representing the transmission signal S21 when the first plug configuration example (Plug-1) is connected to the first to fourth receptacle configuration examples (Receptacle-0 to Receptacle-3), and FIG. 24 is a graph representing the reflection signal S11 when the first plug configuration example (Plug-1) is connected to the first to fourth receptacle configuration examples (Receptacle-0 to Receptacle-3).

Figure 25:
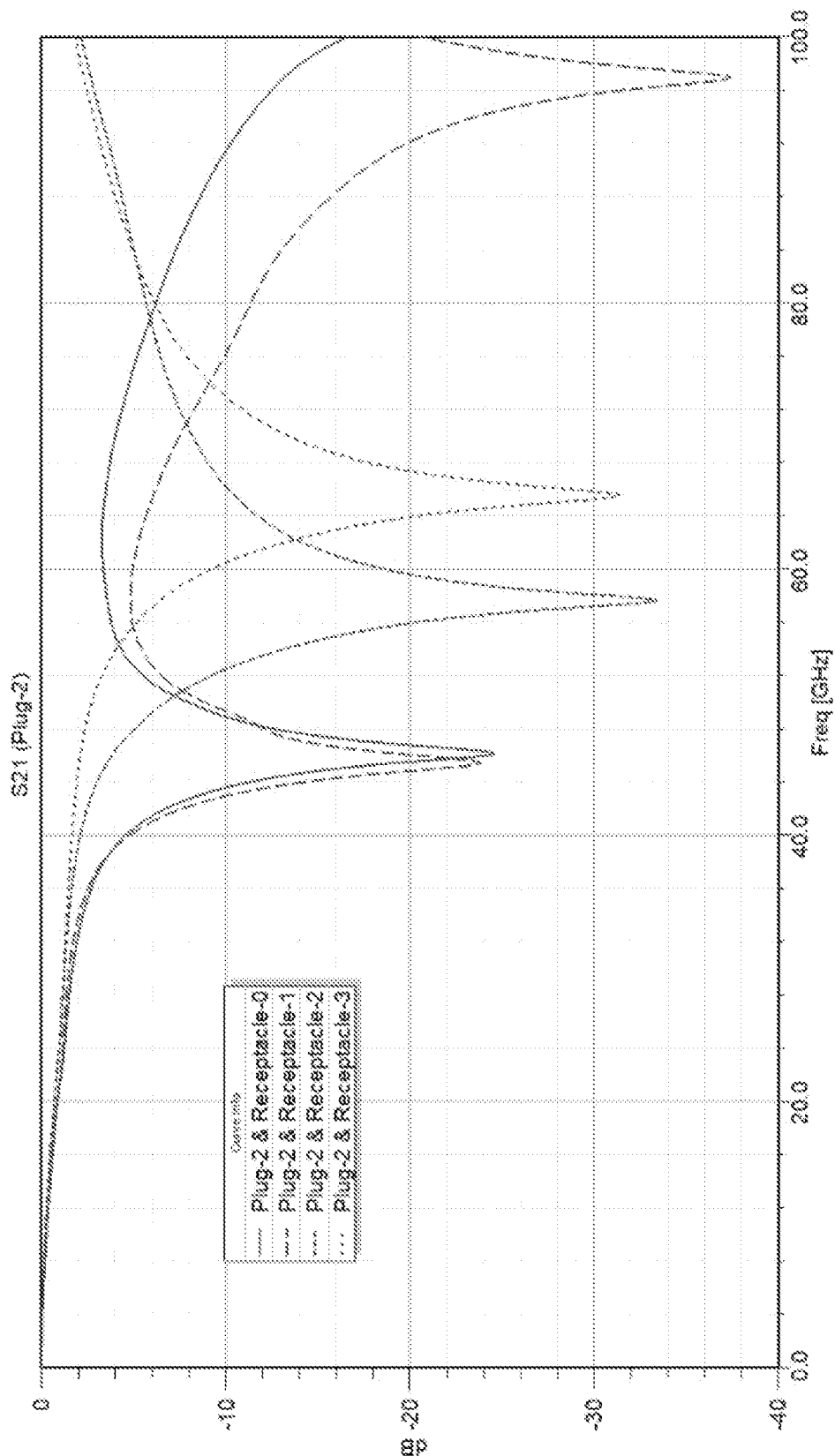
FIG. 25 is a graph representing the transmission signal S21 when the second plug configuration example (Plug-2) is connected to the first to fourth receptacle configuration examples (Receptacle-0 to Receptacle-3).
Figure 26:
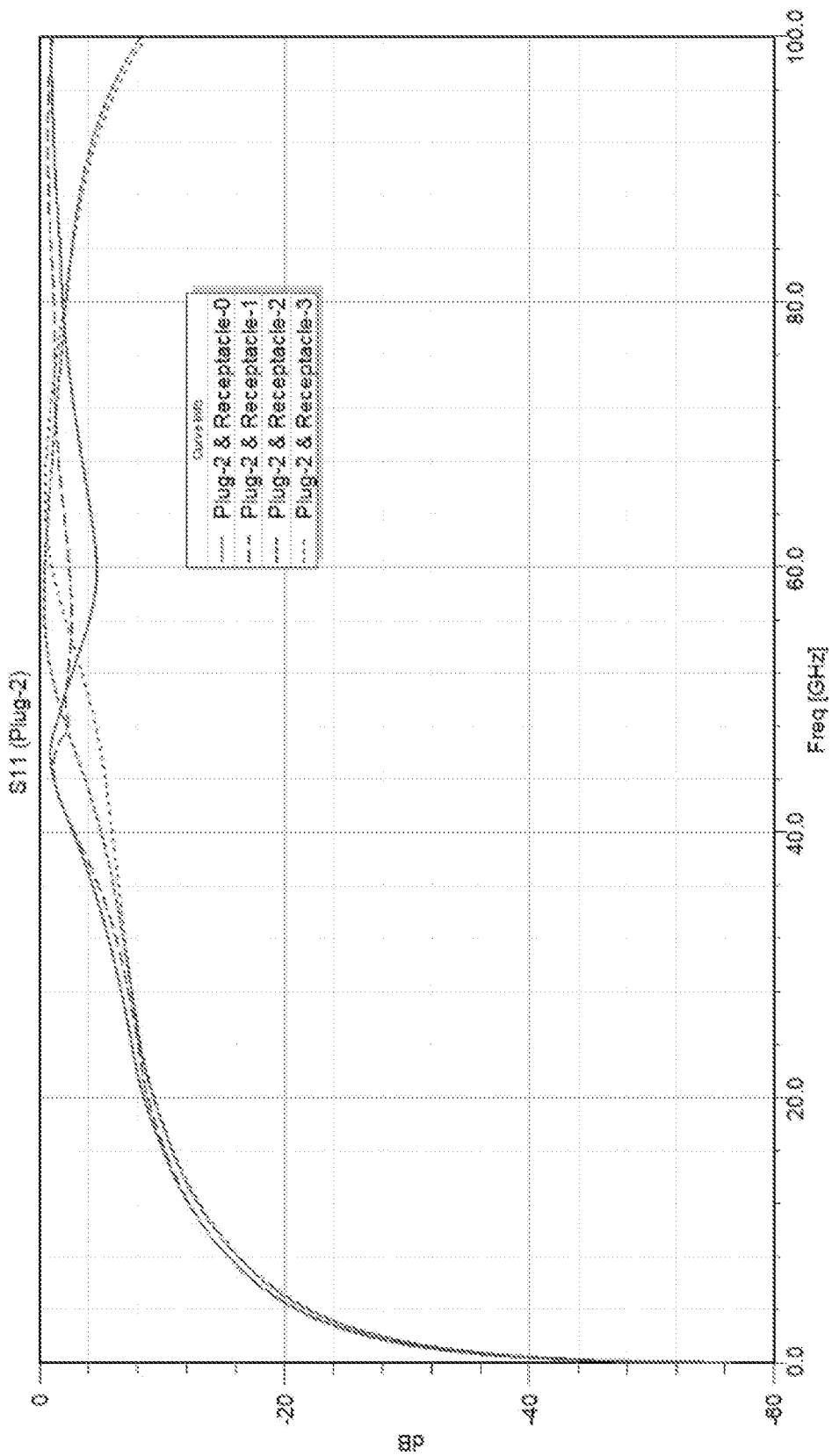
FIG. 26 is a graph representing the reflection signal S11 when the second plug configuration example (Plug-2) is connected to the first to fourth receptacle configuration examples (Receptacle-0 to Receptacle-3).

FIG. 25 is a graph representing the transmission signal S21 when the second plug configuration example (Plug-2) is connected to the first to fourth receptacle configuration examples (Receptacle-0 to Receptacle-3), and FIG. 26 is a graph representing the reflection signal S11 when the second plug configuration example (Plug-2) is connected to the first to fourth receptacle configuration examples (Receptacle-0 to Receptacle-3).

Figure 27:
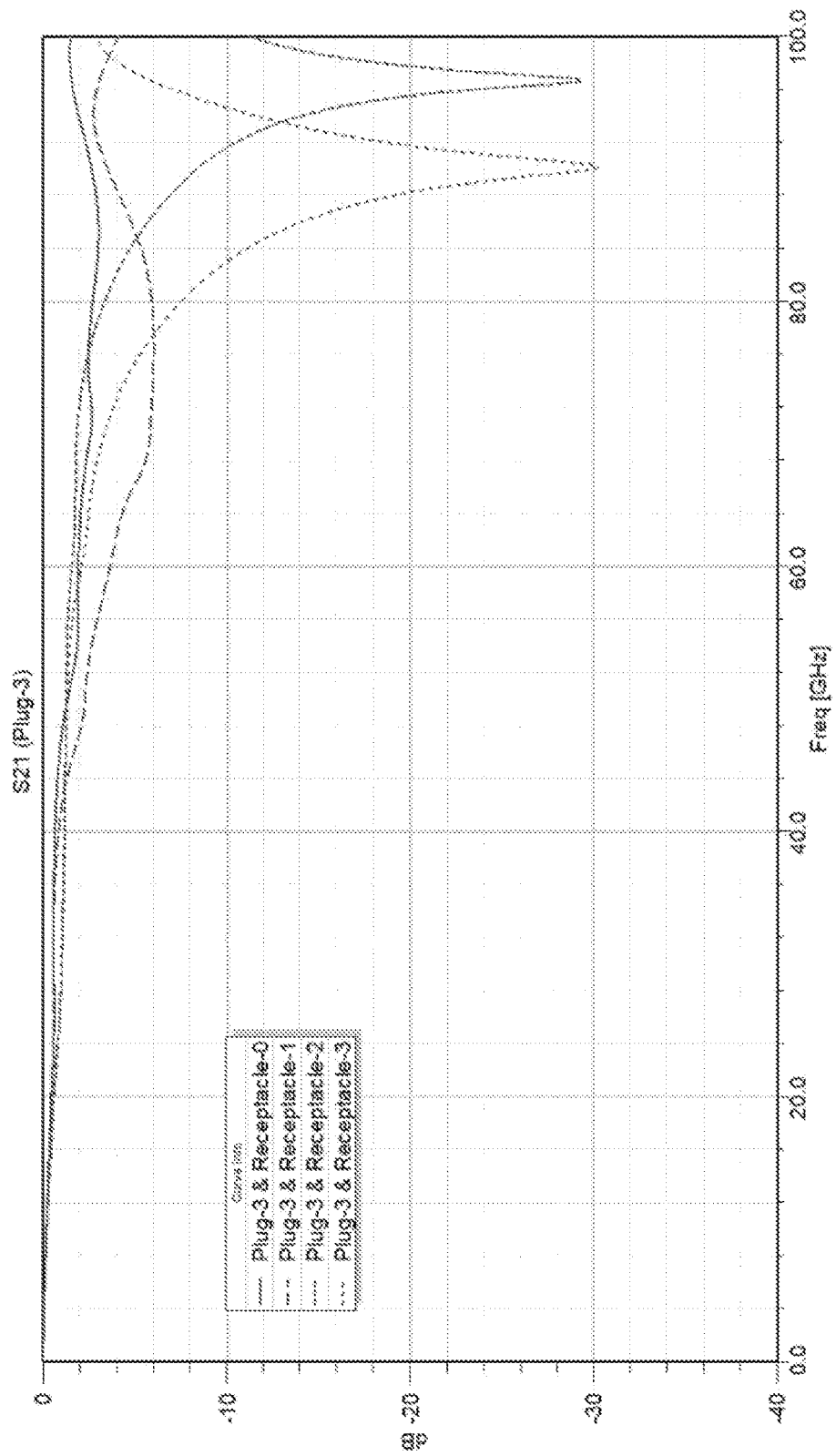
FIG. 27 is a graph representing the transmission signal S21 when the third plug configuration example (Plug-3) is connected to the first to fourth receptacle configuration examples (Receptacle-0 to Receptacle-3).
Figure 28:
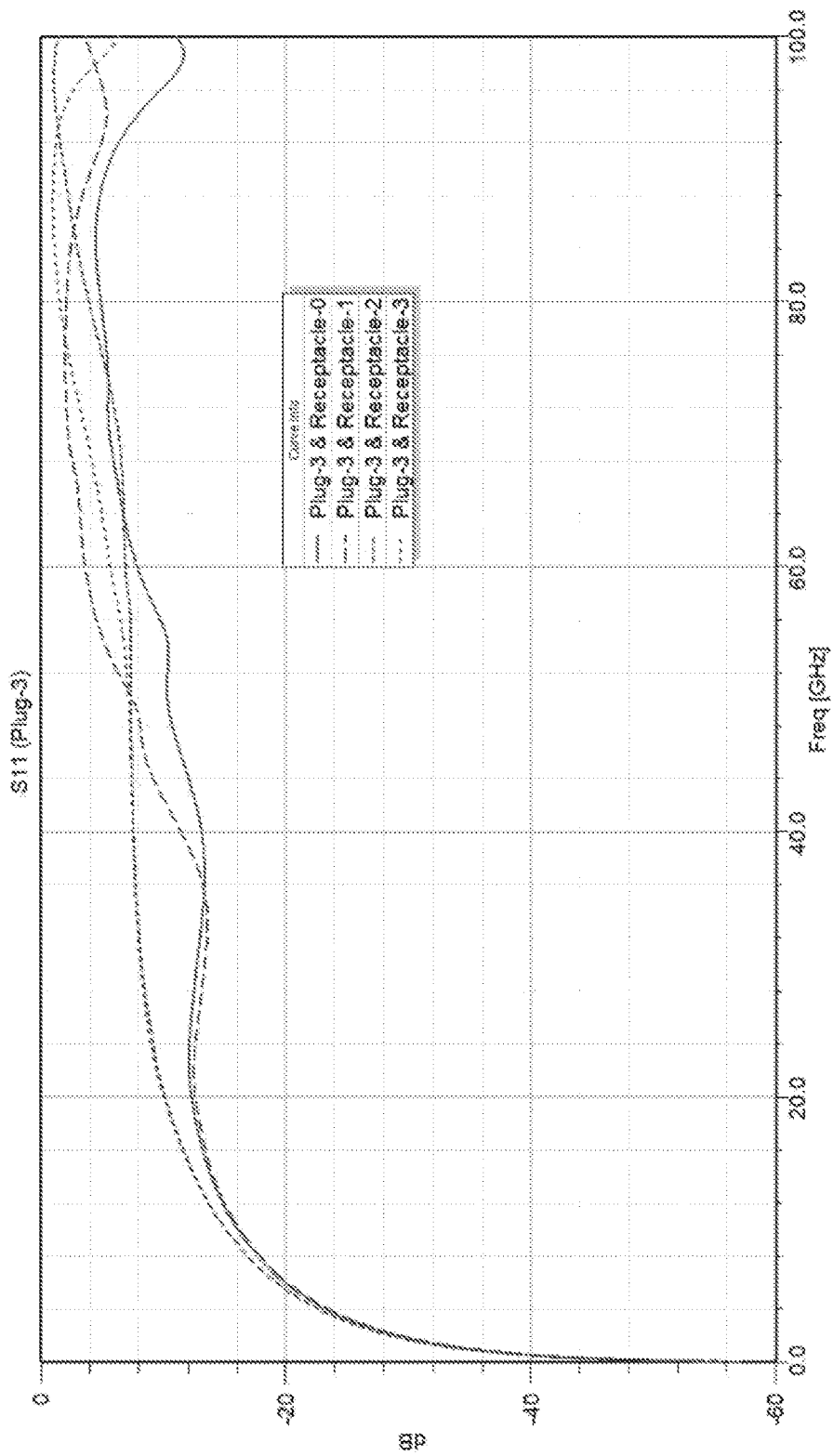
FIG. 28 is a graph representing the reflection signal S11 when the third plug configuration example (Plug-3) is connected to the first to fourth receptacle configuration examples (Receptacle-0 to Receptacle-3).

FIG. 27 is a graph representing the transmission signal S21 when the third plug configuration example (Plug-3) is connected to the first to fourth receptacle configuration examples (Receptacle-0 to Receptacle-3), and FIG. 28 is a graph representing the reflection signal S11 when the third plug configuration example (Plug-3) is connected to the first to fourth receptacle configuration examples (Receptacle-0 to Receptacle-3).

Figure 29:
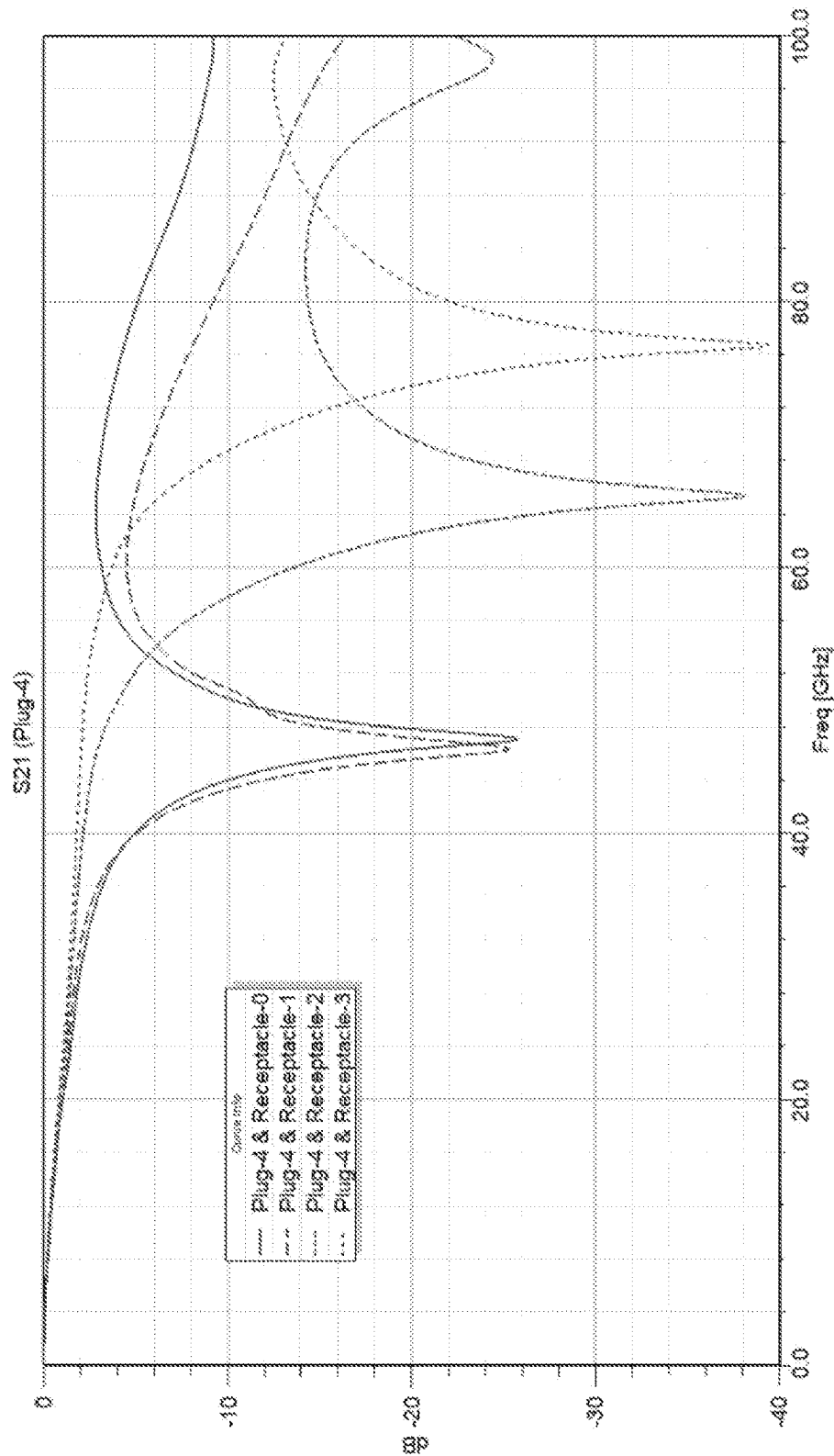
FIG. 29 is a graph representing the transmission signal S21 when the fourth plug configuration example (Plug-4) is connected to the first to fourth receptacle configuration examples (Receptacle-0 to Receptacle-3).
Figure 30:
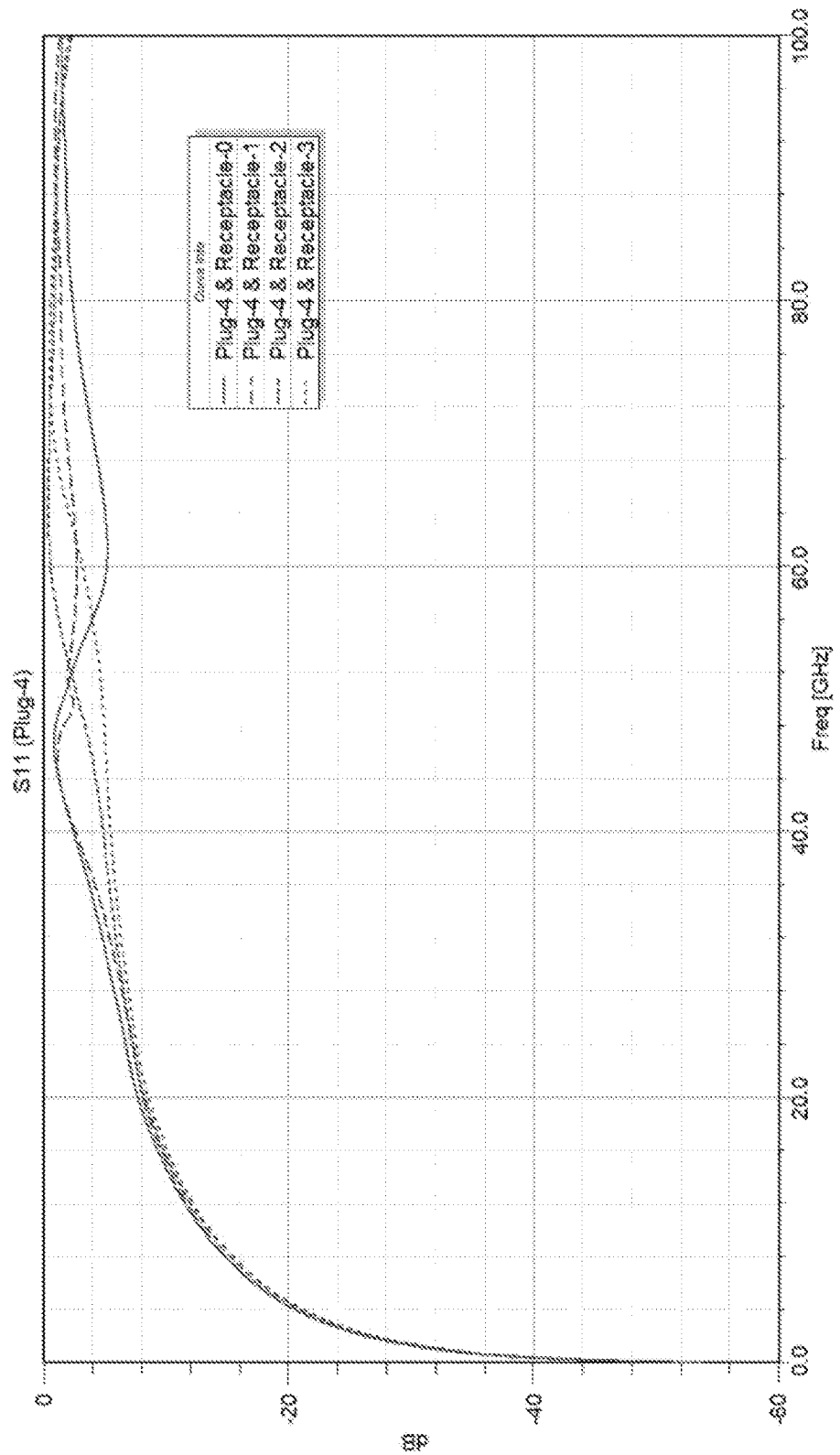
FIG. 30 is a graph representing the reflection signal S11 when the fourth plug configuration example (Plug-4) is connected to the first to fourth receptacle configuration examples (Receptacle-0 to Receptacle-3).

FIG. 29 is a graph representing the transmission signal S21 when the fourth plug configuration example (Plug-4) is connected to the first to fourth receptacle configuration examples (Receptacle-0 to Receptacle-3), and FIG. 30 is a graph representing the reflection signal S11 when the fourth plug configuration example (Plug-4) is connected to the first to fourth receptacle configuration examples (Receptacle-0 to Receptacle-3).

From the graphs shown in FIGS. 23 to 30, it has been revealed that preferable combinations of the plug-receptacle terminal structure are: the first plug configuration example (Plug-1) with the first receptacle configuration example (Receptacle-0) or the second receptacle configuration example (Receptacle-1); the second plug configuration example (Plug-2) with the fourth receptacle configuration example (Receptacle-3); the third plug configuration example (Plug-3) with the first receptacle configuration example (Receptacle-0) or the second receptacle configuration example (Receptacle-1); and the fourth plug configuration example (Plug-4) with the fourth receptacle configuration example (Receptacle-3).

High Frequency Characteristics of First Loop Plug Configuration Example to Fourth Loop Plug Configuration Example (Plug-1 Loop to Plug-4 Loop)]

Figure 31:
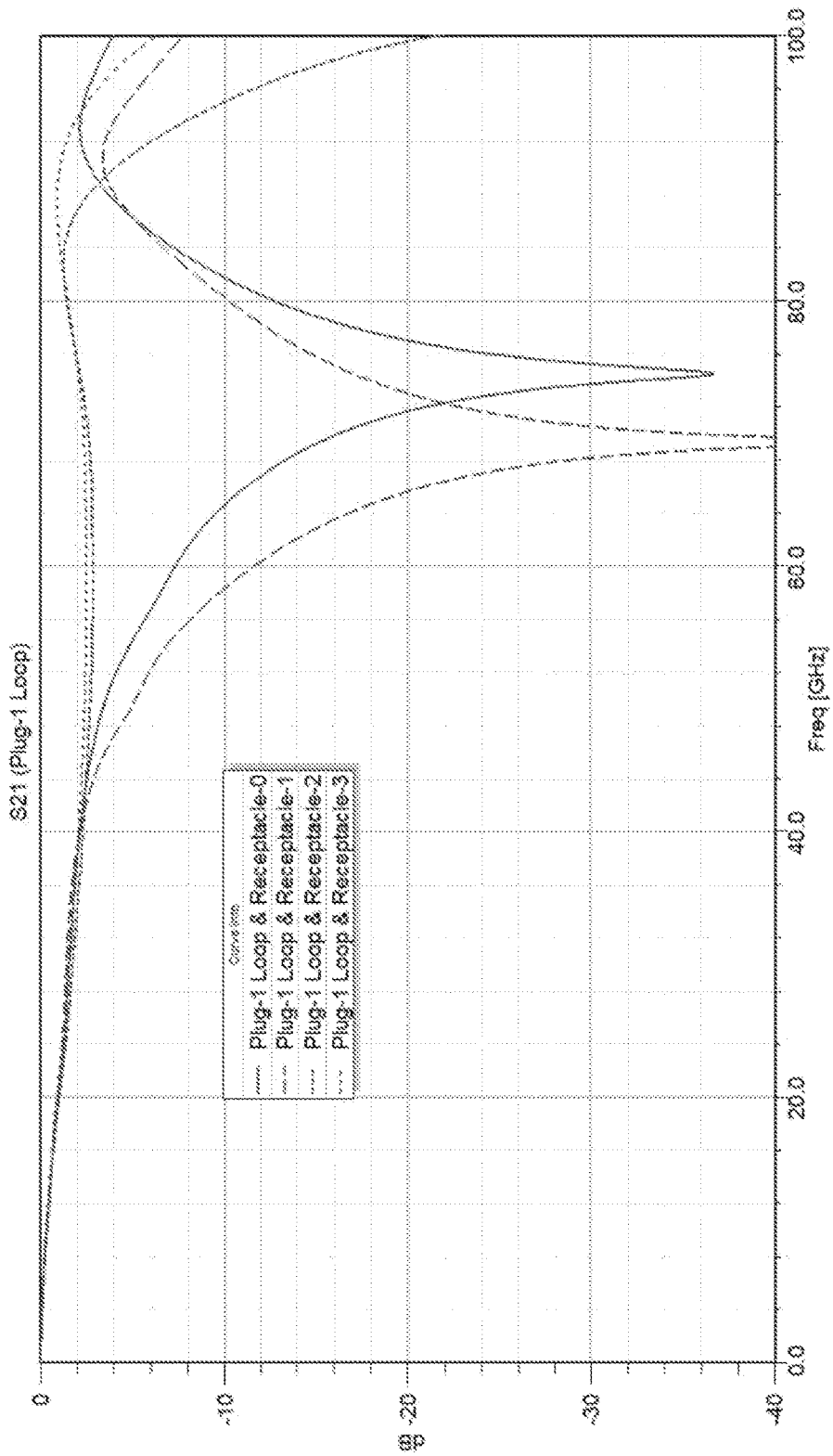
FIG. 31 is a graph representing the transmission signal S21 when the first loop plug configuration example (Plug-1 Loop) is connected to the first to fourth receptacle configuration examples (Receptacle-0 to Receptacle-3).
Figure 32:
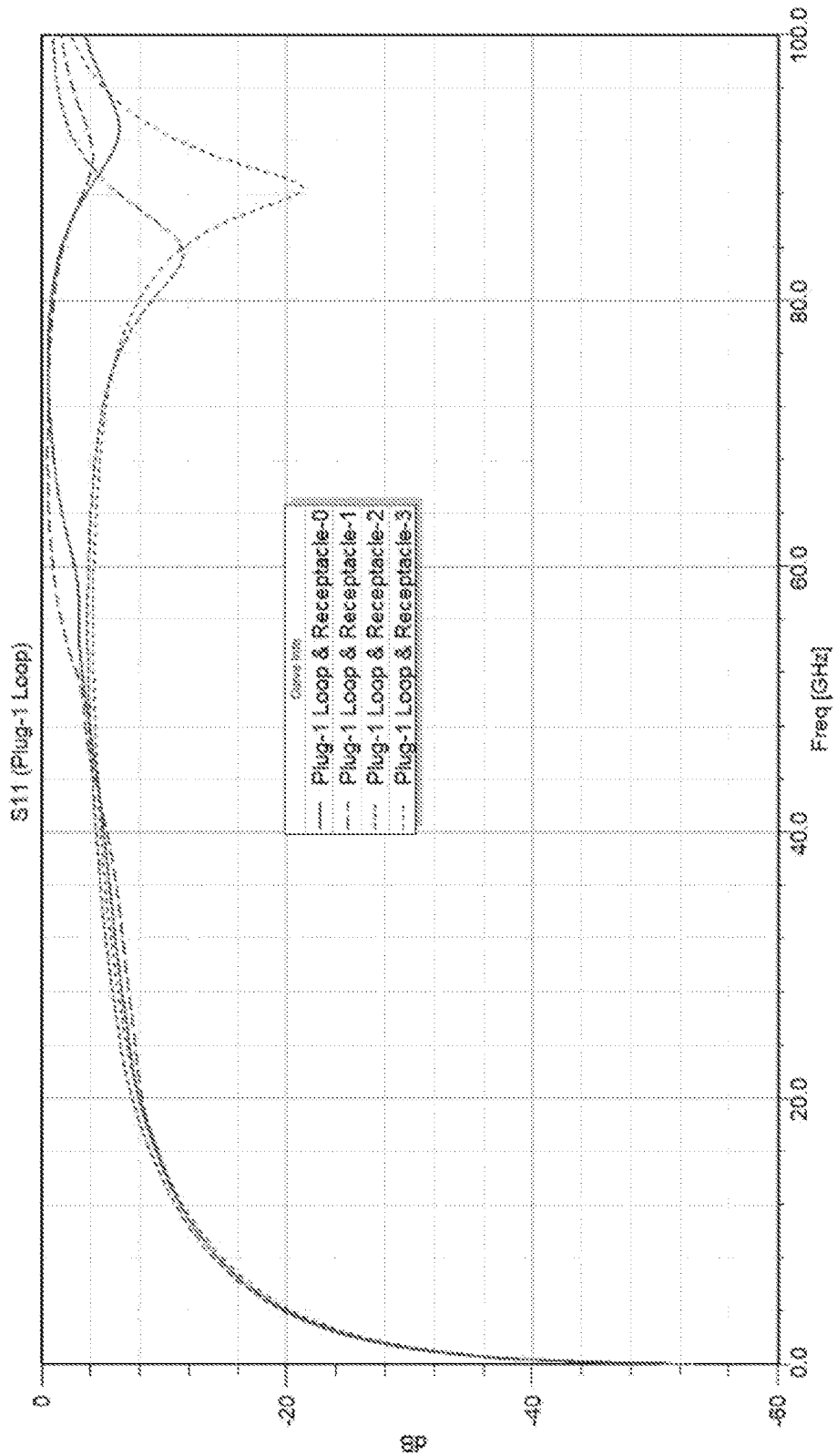
FIG. 32 is a graph representing the reflection signal S11 when the first loop plug configuration example (Plug-1 Loop) is connected to the first to fourth receptacle configuration examples (Receptacle-0 to Receptacle-3).

FIG. 31 is a graph representing the transmission signal S21 when the first loop plug configuration example (Plug-1 Loop) is connected to the first to fourth receptacle configuration examples (Receptacle-0 to Receptacle-3), and FIG. 32 is a graph representing the reflection signal S11 when the first loop plug configuration example (Plug-1 Loop) is connected to the first to fourth receptacle configuration examples (Receptacle-0 to Receptacle-3).

Figure 33:
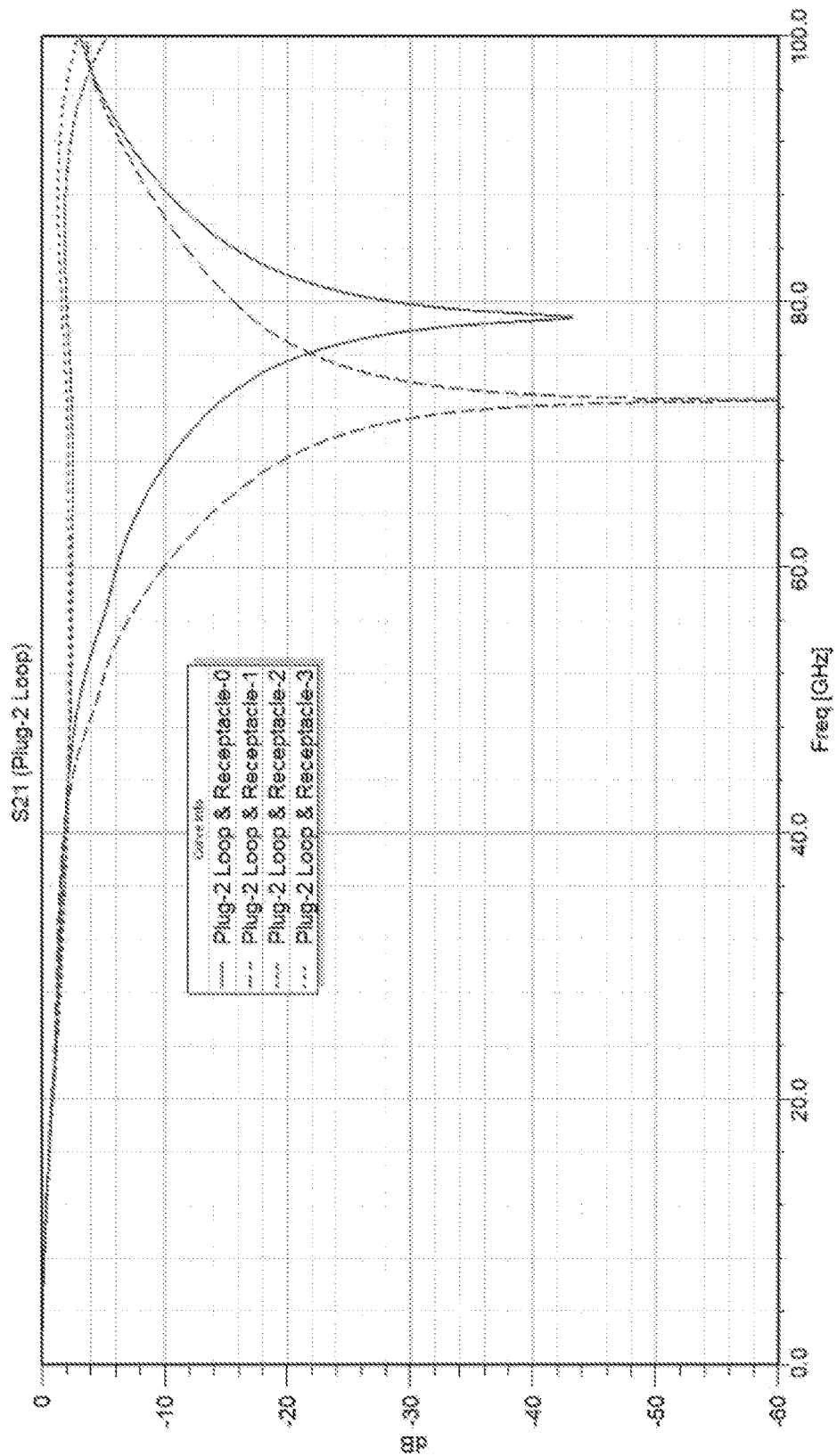
FIG. 33 is a graph representing the transmission signal S21 when the second loop plug configuration example (Plug-2 Loop) is connected to the first to fourth receptacle configuration examples (Receptacle-0 to Receptacle-3).
Figure 34:
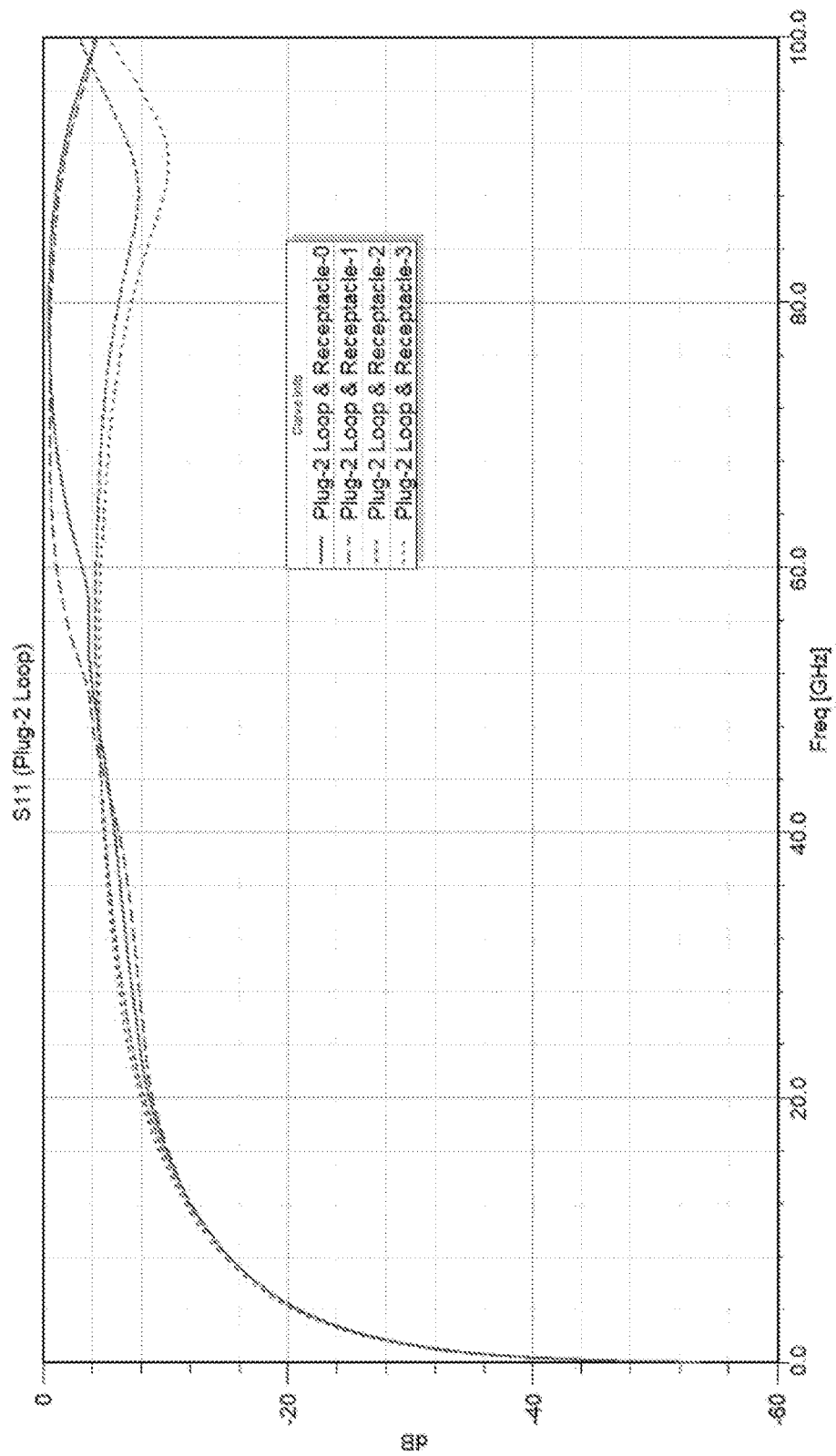
FIG. 34 is a graph representing the reflection signal S11 when the second loop plug configuration example (Plug-2 Loop) is connected to the first to fourth receptacle configuration examples (Receptacle-0 to Receptacle-3).

FIG. 33 is a graph representing the transmission signal S21 when the second loop plug configuration example (Plug-2 Loop) is connected to the first to fourth receptacle configuration examples (Receptacle-0 to Receptacle-3), and FIG. 34 is a graph representing the reflection signal S11 when the second loop plug configuration example (Plug-2 Loop) is connected to the first to fourth receptacle configuration examples (Receptacle-0 to Receptacle-3).

Figure 35:
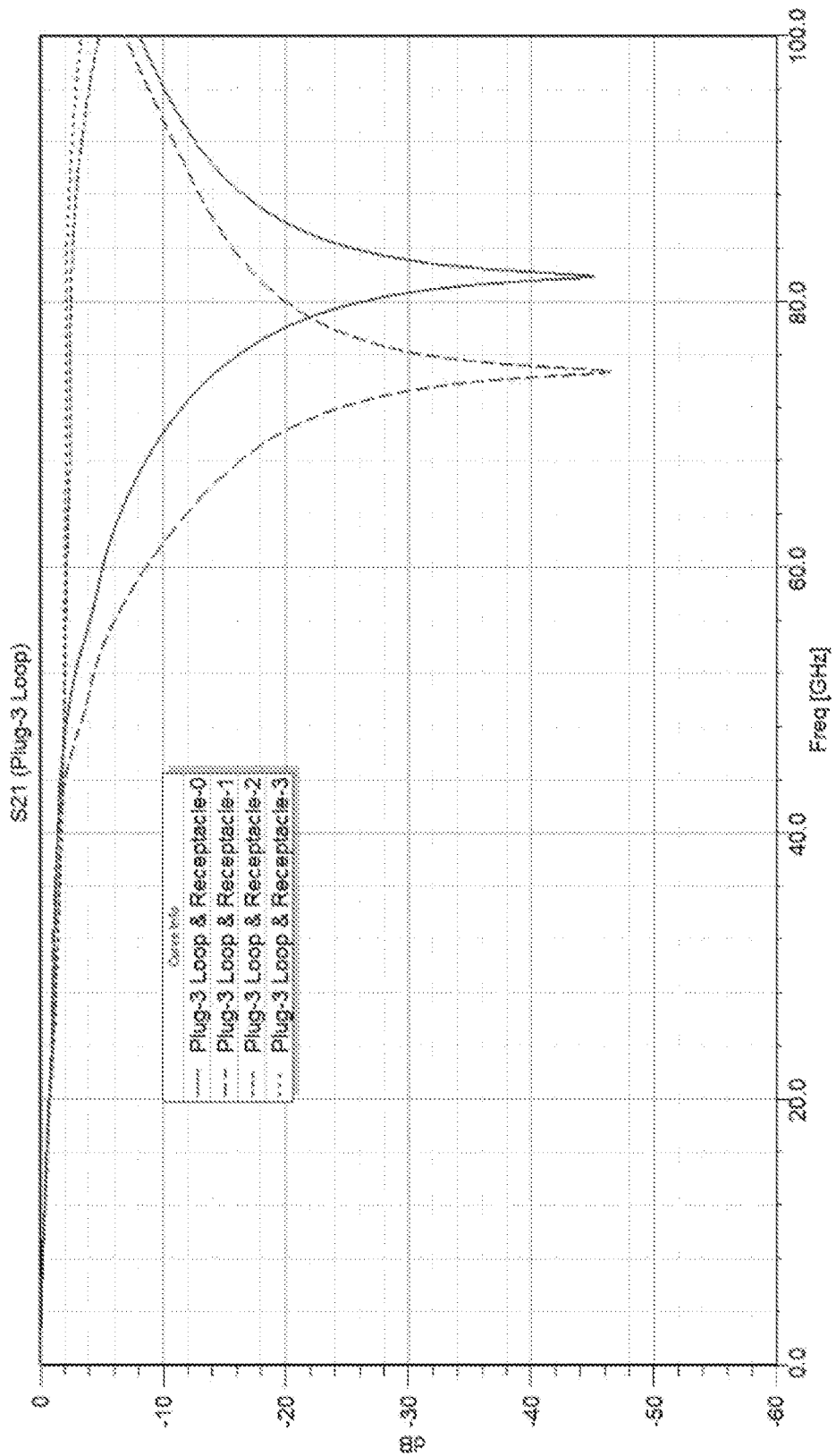
FIG. 35 is a graph representing the transmission signal S21 when the third loop plug configuration example (Plug-3 Loop) is connected to the first to fourth receptacle configuration examples (Receptacle-0 to Receptacle-3).
Figure 36:
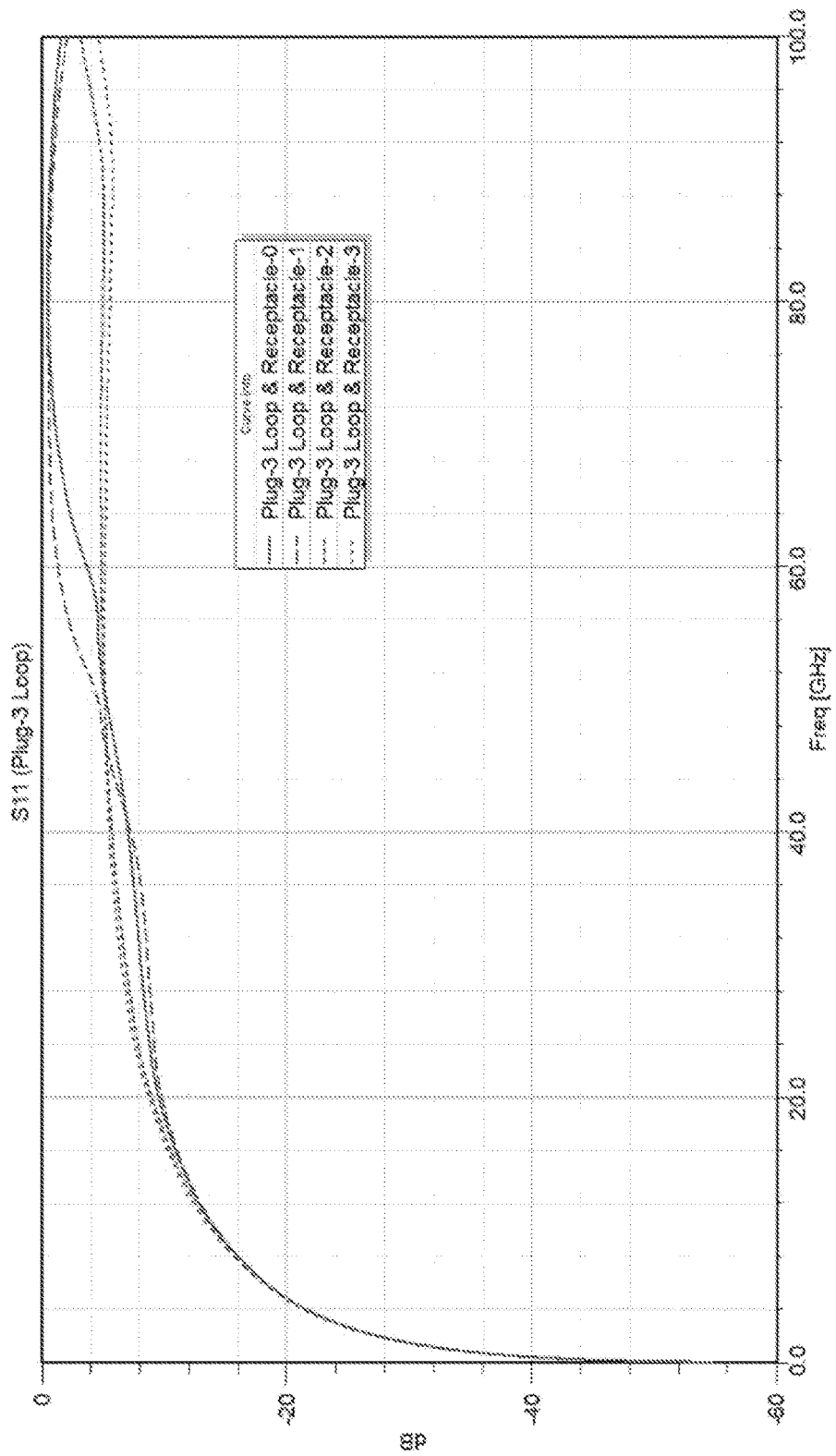
FIG. 36 is a graph representing the reflection signal S11 when the third loop plug configuration example (Plug-3 Loop) is connected to the first to fourth receptacle configuration examples (Receptacle-0 to Receptacle-3).

FIG. 35 is a graph representing the transmission signal S21 when the third loop plug configuration example (Plug-3 Loop) is connected to the first to fourth receptacle configuration examples (Receptacle-0 to Receptacle-3), and FIG. 36 is a graph representing the reflection signal S11 when the third loop plug configuration example (Plug-3 Loop) is connected to the first to fourth receptacle configuration examples (Receptacle-0 to Receptacle-3).

Figure 37:
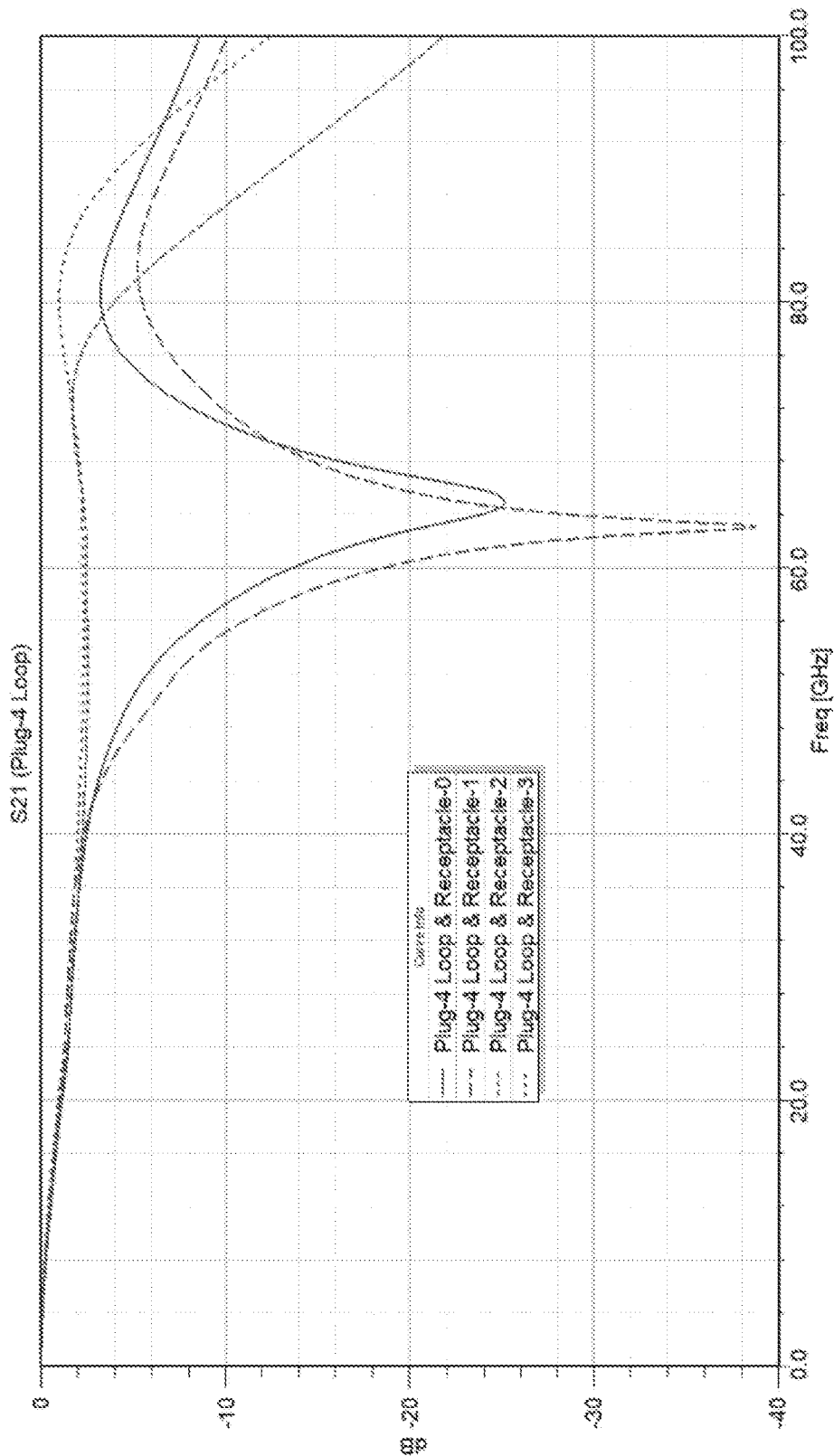
FIG. 37 is a graph representing the transmission signal S21 when the fourth loop plug configuration example (Plug-4 Loop) is connected to the first to fourth receptacle configuration examples (Receptacle-0 to Receptacle-3).
Figure 38:
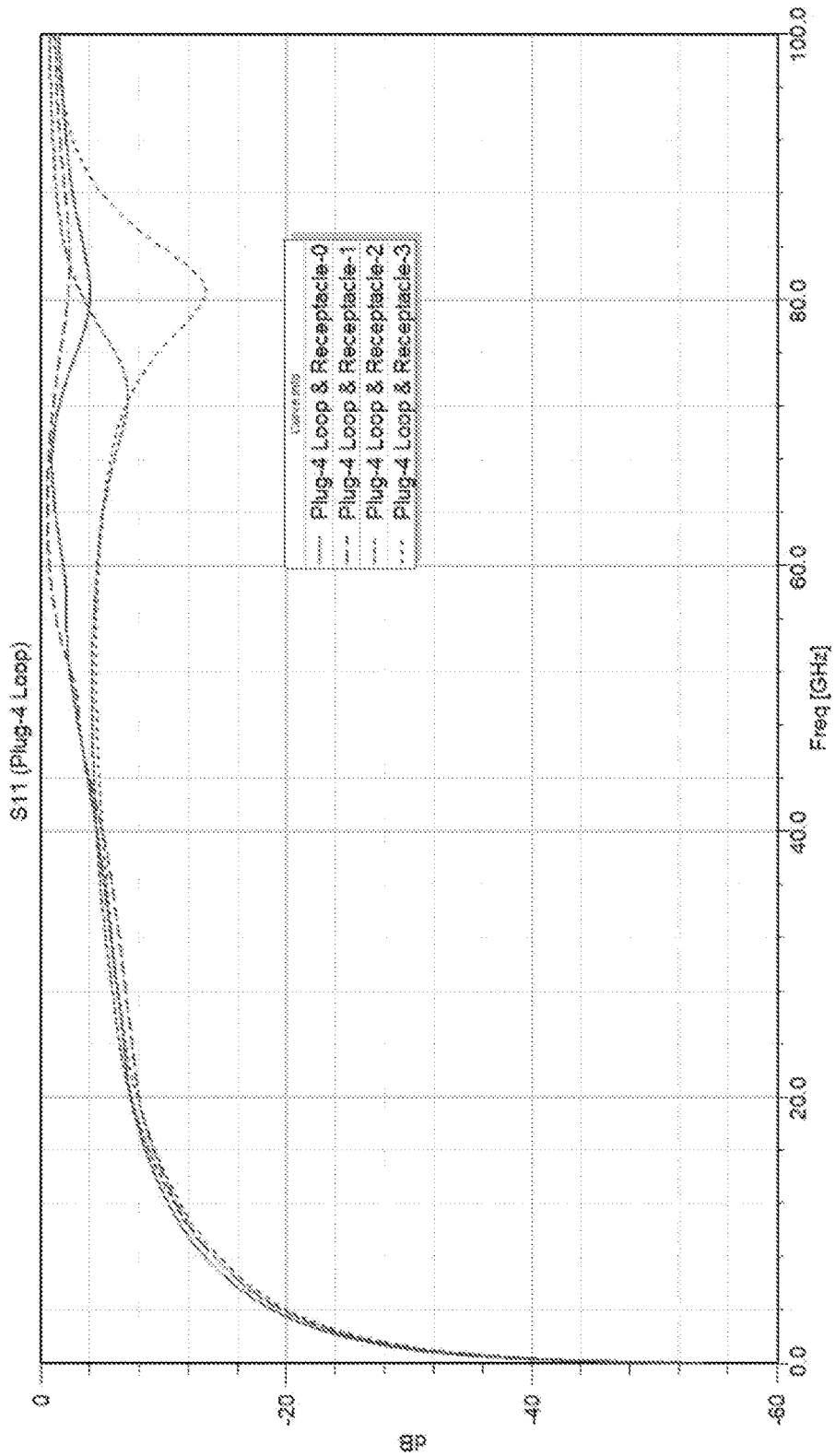
FIG. 38 is a graph representing the reflection signal S11 when the fourth loop plug configuration example (Plug-4 Loop) is connected to the first to fourth receptacle configuration examples (Receptacle-0 to Receptacle-3).

FIG. 37 is a graph representing the transmission signal S21 when the fourth loop plug configuration example (Plug-4 Loop) is connected to the first to fourth receptacle configuration examples (Receptacle-0 to Receptacle-3), and FIG. 38 is a graph representing the reflection signal S11 when the fourth loop plug configuration example (Plug-4 Loop) is connected to the first to fourth receptacle configuration examples (Receptacle-0 to Receptacle-3).

From the graphs shown in FIGS. 31 to 38, it has been revealed that preferable combinations of the plug-receptacle terminal structure are: the first loop plug configuration example (Plug-1 Loop) with the third receptacle configuration example (Receptacle-2) or the fourth receptacle configuration example (Receptacle-3); the second loop plug configuration example (Plug-2 Loop) with third receptacle configuration example (Receptacle-2) or the fourth receptacle configuration example (Receptacle-3); the third loop plug configuration example (Plug-3 Loop) with third receptacle configuration example (Receptacle-2) or the fourth receptacle configuration example (Receptacle-3); and the fourth loop plug configuration example (Plug-4 Loop) with third receptacle configuration example (Receptacle-2) or the fourth receptacle configuration example (Receptacle-3).

Simulation Evaluation

In the conventional solder mounting, the terminal extends outwardly from the bottom surface of the connector, and there has been only a combination of the fourth plug configuration example (Plug-4) and the first receptacle configuration example (Receptacle-0) and its inversion. In addition, a connector for solder mounting will form a stub since one side of both terminals always has the direction opposite to the electric flow. Further, in the conventional solder mounting, the thickness of the solder in the Z direction is as high as 0.1 to 1 mm, which is not suitable for high frequency characteristics.

On the contrary, in the connection using the thermosetting connection material according to the present technology, the terminal need not extend outward from the bottom surface of the connector, the connector can select the direction of the terminal for both terminals, the current flow direction can be selected, the influence of the stub can be reduced, and the high frequency characteristic can be improved. Further, by forming the plug into a loop structure, the influence of the stub can be further reduced. The thickness of the thermosetting connection material is 1 to 30 μm, which is about 1/10 smaller than the thickness of the solder, which improves the high frequency characteristics.

This technology can utilize a region corresponding to a high frequency which has not been used in conventional B2B connectors, thereby extending the region. Therefore, this technology provides a connector having excellent high-frequency characteristics usable for an electronic communication device such as a smartphone. In addition, by using the high-frequency connector, if a substrate is broken, the broken substrate can be replaced with new one at lower cost than the coaxial connector.

5. EXAMPLES

As examples, anisotropic conductive films containing solder particles as a thermosetting connection material were prepared. Using the anisotropic conductive film, the plug and receptacle of the substrate-to-substrate connector were respectively mounted on substrates, and initial conduction and conduction after the insertion/extraction test were evaluated. The present technology is not limited to these examples.

Initial Continuity Evaluation

With regard to the plug mounting body sample and the receptacle mounting body sample, by flowing a current of 1 mA between the terminal of the connector and the corresponding terminal of the substrate, the resistance value was measured, and the median value was calculated. Mounting bodies with a median resistance value of 1.0Ω or less was evaluated as "GOOD" and other mounting bodies were evaluated as "BAD".

Conductivity Evaluation After Insertion/Extraction Test

Using a plug mounting body sample and a receptacle mounting body sample, ten-times insertion/extraction test (repetitive connection test) was performed. The conductions of the plug mounting body sample and the receptacle mounting body sample after the insertion/extraction test were evaluated in the same way as the initial conduction.

Preparation of ACF-A

As shown in Table 1, an anisotropic conductive film (ACF-A) was prepared by blending: 80 parts by mass of solid epoxy resin (bisphenol F type epoxy resin, manufactured by Mitsubishi Chemical, JER4007P, softening point 108° C.); 20 parts by mass of liquid epoxy resin (dicyclopentadiene skeleton epoxy resin, manufactured by ADEKA, EP4088L); 5 parts by mass of epoxy resin curing agent (imidazole curing agent, manufactured by Shikoku Chemical Industry, Curezole 2P4MHZ-PW); 3 parts by mass of flux compound (glutaric acid (1,3-propanedicarboxylic acid), manufactured by Tokyo Chemical); and 50 parts by mass of solder particles (MCP-137, 5N Plus inc., Sn-58 Bi alloy, solidus temperature 138° C.) having an average particle diameter of 30 μm. The minimum melt viscosity of the anisotropic conductive film was 6.1 Pa*s, and the minimum melt viscosity reaching temperature was 114° C. The exothermic peak temperature of the anisotropic conductive film was 163° C.

A solid epoxy resin dissolved in PMA (propylene glycol monomethyl ether acetate) and a liquid epoxy resin are mixed with MEK (methyl ethyl ketone) solution of a flux compound and an epoxy resin curing agent. Solder particles were dispersed in the mixed solution, and then applied by a gap coater on a PET (polyethylene terephthalate) film so that the thickness after drying the solvent was +5 μm of the average particle diameter of the solder particles, thereby preparing an anisotropic conductive film (ACF-A). The drying was carried out at 70° C. for 5 min.

Preparation of ACF-B

As shown in Table 1, an anisotropic conductive film (ACF-B) was prepared in the same manner as ACF-A except that solder particles (MCP-137, 5N Plus inc., Sn-58Bi alloy, solidus temperature 138° C.) having an average particle diameter of 20 μm were used. The minimum melt viscosity of the anisotropic conductive film was 6.1 Pa*s, and the minimum melt viscosity reaching temperature was 114° C. The exothermic peak temperature of the anisotropic conductive film was 163° C.

Preparation of ACF-C

As shown in Table 1, an anisotropic conductive film (ACF-C) was prepared in the same manner as ACF-A except that solder particles (MCP-137, 5N Plus inc., Sn-58Bi alloy, solidus temperature 138° C.) having an average particle diameter of 10 μm were used. The minimum melt viscosity of the anisotropic conductive film was 6.1 Pa*s, and the minimum melt viscosity reaching temperature was 114° C. The exothermic peak temperature of the anisotropic conductive film was 163° C.

Preparation of ACF-D

As shown in Table 1, an anisotropic conductive film (ACF-D) was prepared by blending: 15 parts by mass of a liquid epoxy resin (EP828, manufactured by Mitsubishi Chemical); 20 parts by mass of a phenoxy resin (YP50, manufactured by Nippon Steel Chemical); 18 parts by mass of a butadiene-acrylonitrile rubber (XER-91, manufactured by JSR); 4 parts by mass of a hydroxyl group-containing acrylic rubber (SG-80H, manufactured by Nagase ChemteX); 40 parts by mass of a microcapsule type amine curing agent (Novacure HX3941HP, manufactured by Asahi Kasei E Materials); and 50 parts by mass of solder particles (MCP-137, manufactured by 5N Plus inc., Sn-58Bi alloy, solidus temperature 138) with an average particle diameter of 30 μm.

A phenoxy resin dissolved in PMA (propylene glycol monomethyl ether acetate) and a liquid epoxy resin are mixed with a butadiene-acrylonitrile rubber, a hydroxyl group-containing acrylic rubber, and a microcapsule type amine curing agent. Solder particles were dispersed in the mixed solution, and then applied by a gap coater on a PET (polyethylene terephthalate) film so that the thickness after drying the solvent was +5 μm of the average particle diameter of the solder particles, thereby preparing an anisotropic conductive film (ACF-D). The drying was carried out at 70° C. for 5 min.

TABLE 1

| | | ACF-A | ACF-B | ACF-C | ACF-D |
|---|---|---|---|---|---|
| solid epoxy resin | JER4007P | 80 | 80 | 80 | — |
| liquid epoxy resin | EP4088L | 20 | 20 | 20 | — |
| liquid epoxy resin | EP828 | — | — | — | 15 |
| phenoxy resin | YP50 | — | — | — | 20 |
| butadiene-acrylonitrile rubber | XER-91 | — | — | — | 18 |
| hydroxyl group-containing acrylic rubber | SG-80H | — | — | — | 4 |
| imidazole curing agent | Curezole 2P4MHZ-PW | 5 | 5 | 5 | — |
| microcapsule type amine curing agent | Novacure HX3941HP | — | — | — | 40 |
| flux compound | glutaric acid | 3 | 3 | 3 | — |
| solder particle, average diamemeter 10 μm | MCP-137 | — | — | 50 | — |
| solder particle, average diamemeter 20 μm | MCP-137 | — | 50 | — | — |
| solder particle, average diamemeter 30 μm | MCP-137 | 50 | — | — | 50 |
| total [parts by mass] | | 139 | 139 | 139 | 147 |

Example 1

A plug and receptacle of a substrate-to-substrate connector (manufactured by HIROSE, BM23FR0.6-20DS/DP) were prepared. The bottom surface of the connector had a level difference (undulation) of about 20 μm. Then, as shown in FIGS. 2 to 4, for each connector of the plug and receptacle, the lead terminal extending toward the outside of the connector was bent to the bottom surface of the connector, and the height of the terminal surface was aligned. The minimum height (distance) between the terminal surface and the bottom surface of the connector was 50 µm. Further, as shown in FIGS. 2 and 3, the reinforcing portions of the connectors of the plug and the receptacle were removed.

A flexible printed circuit board (manufactured by Dexerials, FPC for evaluation, Ni—Au plating) corresponding to the plug and a rigid circuit board (manufactured by Dexerials, glass epoxy substrate for evaluation, 18 µm thick Cu pattern, Ni-Au plating) corresponding to the receptacle were prepared.

The plug was aligned on a flexible substrate via an anisotropic conductive film and fixed without load at room temperature. The receptacle was also aligned on a rigid substrate via an anisotropic conductive film and fixed without load at room temperature. Then, the plug was reflow mounted on the flexible substrate, the receptacle was reflow mounted on the rigid substrate, and a plug mounting body sample and a receptacle mounting body sample of Example 1 were prepared. The reflow conditions were 150° C. to 260° C., 100 sec, and peak top temperature of 260° C. The initial conduction evaluation results and the conduction evaluation results after the insertion/extraction test of the plug mounting body sample and the receptacle mounting body sample were shown in Table 2.

Example 2

A plug mounting body sample and a receptacle mounting body sample of Example 2 were prepared in the same manner as in Example 1 except that ACF-B was used as the anisotropic conductive film. The initial conduction evaluation results and the conduction evaluation results after the insertion/extraction test of the plug mounting body sample and the receptacle mounting body sample were shown in Table 2.

Example 3

A plug mounting body sample and a receptacle mounting body sample of Example 3 were prepared in the same manner as in Example 1 except that ACF-C was used as the anisotropic conductive film. The initial conduction evaluation results and the conduction evaluation results after the insertion/extraction test of the plug mounting body sample and the receptacle mounting body sample were shown in Table 2.

Comparative Example 1

A plug mounting body sample and a receptacle mounting body sample of Comparative Example 1 were prepared in the same manner as in Example 1 except that ACF-D was used as the anisotropic conductive film. The initial conduction evaluation results and the conduction evaluation results after the insertion/extraction test of the plug mounting body sample and the receptacle mounting body sample were shown in Table 2.

Comparative Example 2

ACF-B was prepared as an anisotropic conductive film.
A plug and receptacle of a substrate-to-substrate connector (manufactured by HIROSE, BM23FR0.6-20DS/DP) was prepared. The bottom surface of the connector had a level difference (undulation) of about 20 µm. In the connector of the plug and receptacle, the lead terminal extending outward from each connector and the reinforcing portion were left as they were.

A flexible printed circuit board (manufactured by Dexerials, FPC for evaluation, Ni—Au plating) corresponding to the plug and a rigid circuit board (manufactured by Dexerials, glass epoxy substrate for evaluation, Ni—Au plating) corresponding to the receptacle were prepared.

The plug was aligned on a flexible substrate via an anisotropic conductive film and fixed without load at room temperature. The receptacle was also aligned on a rigid substrate via an anisotropic conductive film and fixed without load at room temperature.

Then, the plug was reflow mounted on the flexible substrate, the receptacle was reflow mounted on the rigid substrate, and a plug mounting body sample and a receptacle mounting body sample of Comparative Example 2 were prepared. The reflow conditions were 150° C. to 260° C., 100 sec, and peak top temperature of 260° C. The initial conduction evaluation results and the conduction evaluation results after the insertion/extraction test of the plug mounting body sample and the receptacle mounting body sample were shown in Table 2.

Comparative Example 3

A plug mounting body sample and a receptacle mounting body sample of Comparative Example 3 were prepared in the same manner as in Comparative Example 2 except that ACF-C was used as the anisotropic conductive film. The initial conduction evaluation results and the conduction evaluation results after the insertion/extraction test of the plug mounting body sample and the receptacle mounting body sample were shown in Table 2.

Comparative Example 4

A plug mounting body sample and a receptacle mounting body sample of Comparative Example 4 were prepared in the same manner as in Comparative Example 2 except that ACF-D was used as the anisotropic conductive film. The initial conduction evaluation results and the conduction evaluation results after the insertion/extraction test of the plug mounting body sample and the receptacle mounting body sample were shown in Table 2.

TABLE 2

|  | Ex. 1 | Ex. 2 | Ex. 3 | Comp. 1 | Comp. 2 | Comp. 3 | Comp. 4 |
| --- | --- | --- | --- | --- | --- | --- | --- |
| ACF | A | B | C | D | B | C | D |
| average diameter/thickness [µm] | 0.86 | 0.80 | 0.67 | 0.86 | 0.80 | 0.67 | 0.86 |
| connector pitch [mm] | 0.35 | 0.35 | 0.35 | 0.35 | 0.35 | 0.35 | 0.35 |
| terminal bending | with | with | with | with | w/o | w/o | w/o |
| reinforcing portion | w/o | w/o | w/o | w/o | with | with | with |

TABLE 2-continued

|  | Ex. 1 | Ex. 2 | Ex. 3 | Comp. 1 | Comp. 2 | Comp. 3 | Comp. 4 |
|---|---|---|---|---|---|---|---|
| initial conduction evaluation after reflow | Good | Good | Good | Bad | Bad | Bad | Bad |
| conduction evaluation after insertion/extraction test | Good | Good | Good | Bad | Bad | Bad | Bad |

Since the ACF-D used in Comparative Examples 1 and 4 was for thermocompression bonding and did not contain a flux compound, there were no initial conduction between the plug mounting body sample and the receptacle mounting body sample and connection could not be made. The plug and receptacle of the substrate-to-substrate connector used in Comparative Examples 2 and 3 required a large mounting surface because the lead terminal extends outward. Also, the plug and receptacle of the substrate-to-substrate connector used in Comparative Examples 2 and 3 could not be connected due to the level difference in the bottom of the connector.

On the other hand, the plug and receptacle of the substrate-to-substrate connector used in Examples 1 to 3 could be connected because they had a terminal array on the bottom surface of the connector, canceled the level difference in the bottom surface of the connector, and the anisotropic conductive film contains solder particles and a flux compound. Therefore, the terminal array can be made to have a fine pitch, and the connector can be miniaturized.

The receptacle used in Examples 1 to 3 had a connection area of 120 μm×170 μm and L (Line)/S (Space)=120 μm/230 μm; however, by using solder particles having an average particle diameter of 10 μm, it is possible in principle to achieve a fine pitch up to a connection area of 10,000 μm$^8$ (50 μm×200 μm) where L/S is 50 μm/80 μm and the line length is 200 μm.

REFERENCE SIGNS LIST

10 substrate, 11 first terminal array, 20 connector, 21 second terminal array, 30 thermosetting connection material, 31 solder particle, 32 solder-joint portion, 33 thermosetting connection material, 40 plug, 41A first male vertical fitting array, 41B second male vertical fitting array, 42A first terminal array, 42B second terminal array, 43 insulating resin, 50 receptacle, 51A first female vertical fitting array, 51B second female vertical fitting array, 52A first terminal array, 52B second terminal array, 53 insulating resin, 60 tool, 71 first FPC, 72 second FPC, 81a, 82a connecting portion, 81b, 82b male vertical fitting portion, 83a, 84a connecting portion 83b, 84b male vertical fitting portion, 85a, 86a connecting portion, 85b, 86b male vertical fitting portion, 87a, 88a connecting portion, 87b, 88b male vertical fitting portion, 91a, 92a connecting portion, 91b, 92b vertical portion, 91c, 92c female vertical fitting portion, 93a, 94a vertical portion, 93b, 94b connecting portion, 93c, 94c female vertical fitting portion, 140 plug, 141A first male vertical fitting array, 141B second male vertical fitting array, 142A first lead terminal array, 142B second lead terminal array, 143 insulating resin, 150 receptacle, 151A first female vertical fitting array, 151B second female vertical fitting array, 152A first lead terminal array, 152B second lead terminal array, 153 insulating resin

The invention claimed is:

1. A connection body, comprising:
    a substrate having a first terminal array;
    a connector having a second terminal array; and
    an adhesive layer formed by curing a thermosetting connection material connecting the first terminal array and the second terminal array, wherein
    the second terminal array is disposed on the bottom surface of the connector and forms a level difference canceling portion for canceling a level difference in the bottom surface,
    the thermosetting connection material contains solder particles and a flux component,
    the bottom surface of the connector has a level difference in height within a predetermined range, and
    the second terminal array has a terminal surface having a maximum height and a minimum height, the difference therebetween being smaller than the height of the predetermined range.

2. The connection body according to claim 1, wherein the second terminal array has a terminal surface having a maximum height and a minimum height, the difference therebetween being smaller than the average particle diameter of the solder particles.

3. The connection body according to claim 1, wherein the second terminal array extends from the outside to the inside of the bottom surface of the connector.

4. The connection body according to claim 1, wherein the average particle diameter of the solder particles is 30 μm or less.

5. The connection body according to claim 1, wherein the minimum inter-terminal distance in the second terminal array is 0.8 mm or less.

6. The connection body according to claim 1, wherein the connector has no reinforcing portion.

7. A method for manufacturing a connection body, comprising:
    placing, on a substrate having a first terminal array, via a thermosetting connection material containing solder particles and a flux component, a connector having a bottom surface on which a second terminal array is arranged and a level difference canceling portion for canceling a level difference in the bottom surface is formed; and
    thermally curing the thermosetting connection material at a temperature equal to or higher than the melting point of the solder particles without pressing the connector, thereby connecting the first terminal array and the second terminal array, wherein
    the bottom surface of the connector has a level difference in height within a predetermined range, and
    the second terminal array has a terminal surface having a maximum height and a minimum height, the difference therebetween being smaller than the height of the predetermined range.

8. The method for manufacturing a connection body according to claim 7, wherein the thermal curing is performed by reflow.

9. The method for manufacturing a connection body according to claim 7, wherein the average particle diameter of the solder particles is 30 μm or less.

10. The method for manufacturing a connection body according to any claim 7, wherein the minimum inter-terminal distance in the second terminal array is 0.8 mm or less.

11. A connector, comprising a terminal array disposed on a bottom surface having a level difference of a predetermined height,
   wherein the difference between the maximum height and the minimum height of a terminal surface of the terminal array is smaller than the level difference.

12. The connector according to claim 11, wherein the terminal array extends from outside to inside the bottom surface of the connector.

\* \* \* \* \*